US012674688B2

(12) United States Patent
Shirakawa et al.

(10) Patent No.: US 12,674,688 B2
(45) Date of Patent: Jul. 7, 2026

(54) POSITION DETECTION DEVICE

(71) Applicant: Proterial, Ltd., Tokyo (JP)

(72) Inventors: Yohei Shirakawa, Tokyo (JP); Yoshiaki Yanagisawa, Tokyo (JP); Takahiro Sugiyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 288 days.

(21) Appl. No.: 18/643,563

(22) Filed: Apr. 23, 2024

(65) Prior Publication Data

US 2024/0361154 A1      Oct. 31, 2024

(30) Foreign Application Priority Data

Apr. 28, 2023   (JP) ................................. 2023-074358
Oct. 12, 2023   (JP) ................................. 2023-177045

(51) Int. Cl.
*G01D 5/20*          (2006.01)
*B62D 15/02*         (2006.01)
(52) U.S. Cl.
CPC ........... *G01D 5/2046* (2013.01); *B62D 15/02* (2013.01); *G01D 2205/18* (2021.05)
(58) Field of Classification Search
CPC .... G01D 5/20; G01D 5/2046; G01D 2205/18; G01D 5/204; G01D 5/2053; G01D 5/145;
(Continued)

(56) References Cited

U.S. PATENT DOCUMENTS 4,556,886 A * 12/1985 Shimizu .................. G01D 5/243
                                                    324/207.17
2018/0009476 A1* 1/2018 Takayanagi ........ B62D 15/0225
(Continued)

FOREIGN PATENT DOCUMENTS

WO        2021/210125 A1   10/2021

*Primary Examiner* — Son T Le
(74) *Attorney, Agent, or Firm* — Studebaker Brackett PLLC

(57)                     ABSTRACT

A position detection device, configured to detect a position of a shaft that moves forward and backward in an axial direction, is provided with an excitation coil that generates an alternating magnetic field; a target fixed to the shaft and interlinked with a magnetic flux of the alternating magnetic field; and a detection coil in which the magnetic flux of the alternating magnetic field is interlinked. The detection coil has a first portion and a second portion in which an induced voltage is generated when the magnetic flux of the alternating magnetic field is interlinked, and a connection portion connecting the first portion and the second portion. The first portion and the second portion respectively extend along a coil longitudinal direction parallel to the axial direction, and at least a portion of each is aligned perpendicular to the coil longitudinal direction. The target has at least one first target portion facing the first portion and at least two second target portions facing the second portion, with the at least two second target portions being spaced apart in the axial direction. An induced voltage generated in the first portion varies with a position of the first target portion with respect to the first portion, and an induced voltage generated in the second portion varies with a position of the second target portion with respect to the second portion. The first target portion is located between the at least two second target portions in the axial direction, and when the shaft is in a central position between one axial moving end and an other axial moving end, the first target portion faces a central part in the coil longitudinal direction of the first portion.

10 Claims, 13 Drawing Sheets

(58) Field of Classification Search
CPC ...... G01D 5/14; B62D 15/02; B62D 15/0225;
G01R 33/0005
See application file for complete search history.

(56) References Cited

U.S. PATENT DOCUMENTS

2020/0361523 A1* 11/2020 Nakamura ......... B62D 15/0235
2021/0114651 A1* 4/2021 Wilson-Jones .... B62D 15/0225

* cited by examiner

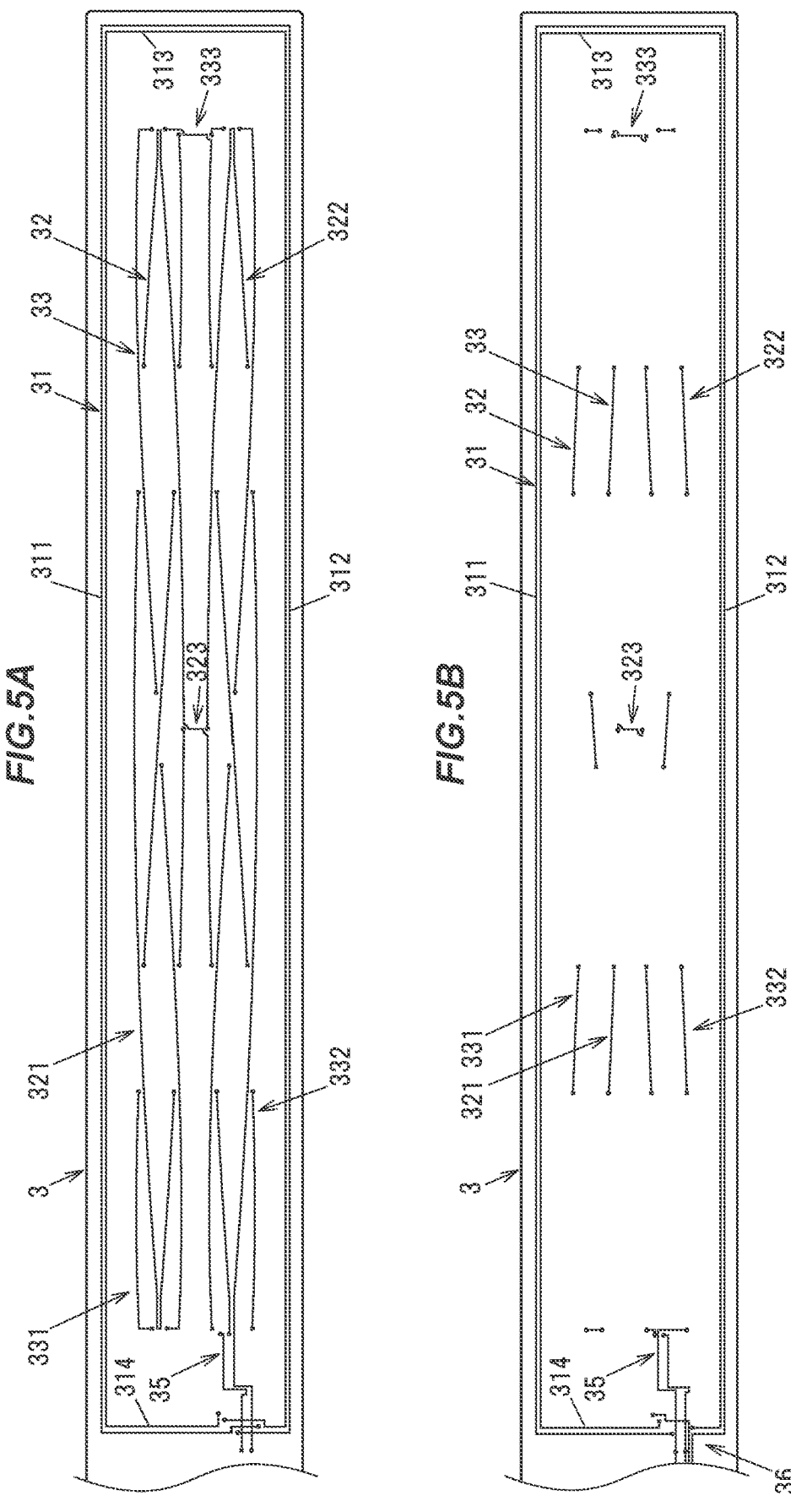

POSITION DETECTION DEVICE

CROSS-REFERENCE TO RELATED APPLICATIONS

The present application is based on Japanese patent application No. 2023-074358 filed on Apr. 28, 2023 and Japanese patent application No. 2023-177045 filed on Oct. 12, 2023, the entire contents of which are incorporated herein by reference.

TECHNICAL FIELD

The present invention relates to a position detection device for detecting the position of a shaft that moves forward and backward in the axial direction.

BACKGROUND OF THE INVENTION

Conventionally, a position detection device that detects the position of a shaft that moves forward and backward in the axial direction is being used, for example, to detect the position of a rack shaft in a steering device of a vehicle.

The detection unit described in Patent Literature 1 detects an axial position of a rack shaft of an electric power steering device and includes a DC power supply, a permanent magnet, an element group composed of first to fourth magnetoresistive elements disposed between the permanent magnet and the rack shaft, and a calculation unit for calculating the position of the rack shaft. In the element group, a series circuit including the first and second magnetoresistive elements being connected in series, and a series circuit including the third and fourth magnetoresistive elements being connected in series are connected in parallel to form a bridge circuit. The potential of a first terminal connected between the first and second magnetoresistive elements and a potential of a second terminal connected between the third and fourth magnetoresistive elements are input to the calculation unit. A plurality of grooves extending in a direction inclined with respect to the axial direction of the rack shaft is formed on the surface of the rack shaft facing the element group.

In the detection unit configured as described above, when the rack shaft moves in the axial direction due to the rotation of the pinion gear shaft meshing with the rack shaft and the relative positions of the first to fourth magnetoresistive elements with respect to the grooves change, the balance of electrical resistance of the first to fourth magnetoresistive elements changes, so that the potentials of the first terminal and the second terminal change. The calculation unit calculates the position of the rack shaft based on changes in these potentials.

Citation List Patent Literature 1: WO2021/210125

SUMMARY OF THE INVENTION

In the detection unit described in Patent Literature 1, if the rack shaft is inclined with respect to the vehicle width direction due to, for example, vibrations caused by vehicle running or the like, the distance between the first to fourth magnetoresistive elements and the rack shaft changes and an error occurs in the detection position of the rack shaft.

Accordingly, it is an object of the present invention to provide a position detection device capable of detecting the position of the rack shaft that moves forward and backward in the axial direction with high accuracy.

To solve the problems mentioned above, the present invention provides a position detection device, configured to detect a position of a shaft that moves forward and backward in an axial direction, comprising:

an excitation coil that generates an alternating magnetic field;

a target fixed to the shaft and interlinked with a magnetic flux of the alternating magnetic field; and a detection coil in which the magnetic flux of the alternating magnetic field is interlinked, wherein the detection coil has a first portion and a second portion in which an induced voltage is generated when the magnetic flux of the alternating magnetic field is interlinked, and a connection portion connecting the first portion and the second portion, wherein the first portion and the second portion respectively extend along a coil longitudinal direction parallel to the axial direction, and at least a portion of each is aligned perpendicular to the coil longitudinal direction, wherein the target has at least one first target portion facing the first portion and at least two second target portions facing the second portion, with the at least two second target portions being spaced apart in the axial direction, wherein an induced voltage generated in the first portion varies with a position of the first target portion with respect to the first portion, and an induced voltage generated in the second portion varies with a position of the second target portion with respect to the second portion, and wherein the first target portion is located between the at least two second target portions in the axial direction, and when the shaft is in a central position between one axial moving end and an other axial moving end, the first target portion faces a central part in the coil longitudinal direction of the first portion.

Advantageous Effects of the Invention

According to a position detection device of the present invention, it is possible to detect the position of a shaft that moves forward and backward in the axial direction with high accuracy.

BRIEF DESCRIPTION OF DRAWINGS

FIG. 5A is a wiring diagram showing the wiring patterns of the first and second wiring layers on the substrate.

FIG. 5B is a wiring diagram showing the wiring patterns of the third and fourth wiring layers.

DETAILED DESCRIPTION OF THE INVENTION

Embodiment

Figure 1:
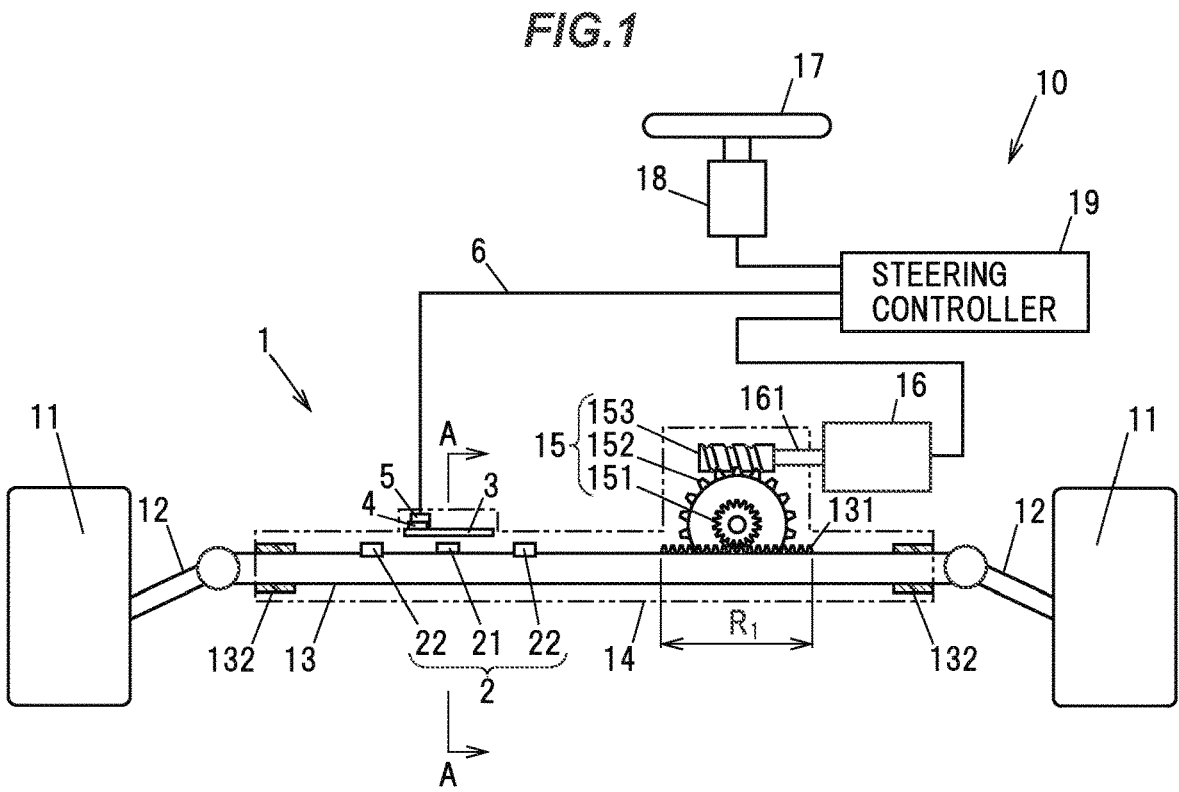
FIG. 1 is a schematic diagram of a vehicle equipped with a steer-by-wire steering device having a stroke sensor as a position detection device according to an embodiment of the present invention.

FIG. 1 is a schematic diagram of a vehicle equipped with a steer-by-wire steering device 10 with a stroke sensor 1 as a position detection device.

As shown in FIG. 1, the steering device 10 comprises a stroke sensor 1, tie rods 12 connected to the steerable wheels 11 (right and left front wheels), a rack shaft 13 connected to the tie rods 12, a cylindrical housing 14 for accommodating the rack shaft 13, a worm reduction mechanism 15 having a pinion gear 151 meshed with rack teeth 131 of the rack shaft 13, an electric motor 16 that applies a moving force to the rack shaft 13 via the worm reduction mechanism 15, a steering wheel 17 to be operated by the driver, a steering angle sensor 18 that for detecting the steering angle of the steering wheel 17, and a steering controller 19 for controlling the electric motor 16 based on the steering angle detected by the steering angle sensor 18.

In FIG. 1, the housing 14 is shown in a virtual line. The rack shaft 13 is made of a steel material such as carbon steel, and is supported by a pair of rack bushings 132 attached to both ends of the housing 14. The worm reduction mechanism 15 has a worm wheel 152 and a worm gear 153, and a pinion gear 151 is attached to the worm wheel 152. The worm gear 153 is attached to a motor shaft 161 of the electric motor 16.

The electric motor 16 generates torque by a motor current supplied from the steering controller 19 and rotates the worm wheel 152 and the pinion gear 151 via the worm gear 153. When the pinion gear 151 rotates, the rack shaft 13 moves forward and backward in the vehicle width direction to steer the left and right steerable wheels 11. The rack shaft 13 can move rightward and leftward in the vehicle width direction within a predetermined range from the neutral position when the steering angle is zero. In FIG. 1, a double arrow indicates a range $R_1$ where the rack shaft 13 can move in the vehicle width direction.

Configuration of Stroke Sensor 1

The stroke sensor 1 has a target (i.e., an object to be detected, detection target) 2 fixed to the rack shaft 13, a substrate 3 arranged to face the target 2, and a circuit unit 4 configured with an IC (integrated circuit) mounted on the substrate 3. The substrate 3 is fixed in the housing 14, parallel to the rack shaft 13. A connector 5 is mounted on the substrate 3, and the substrate 3 and the steering controller 19 are connected by the connector 5 and the cable 6.

The stroke sensor 1 detects the position of the rack shaft 13 with respect to the housing 14 by the position of the target 2 and outputs information on the detected position to the steering controller 19. The steering controller 19 controls the electric motor 16 in such a manner that the position of the rack shaft 13 detected by the stroke sensor 1 corresponds to the steering angle of the steering wheel 17 detected by the steering angle sensor 18.

Figure 2:
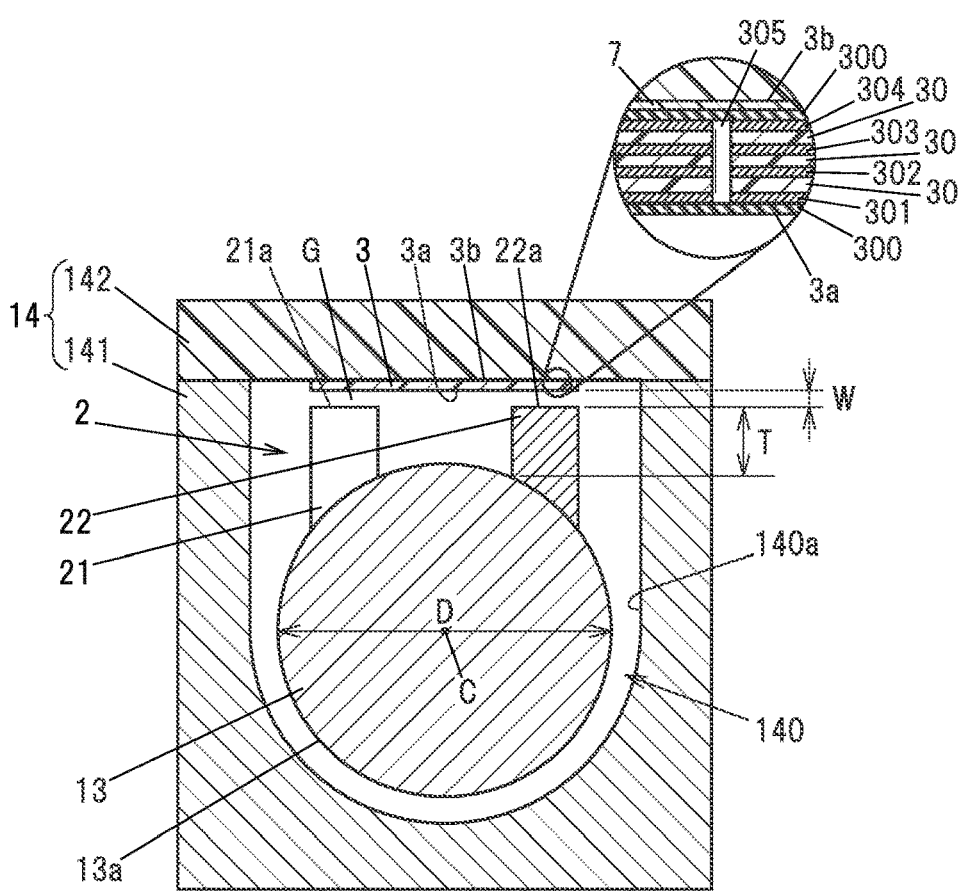
FIG. 2 is a cross-sectional view of a rack shaft, a housing, a target, and a substrate taken along line A-A in FIG. 1.
Figure 3:
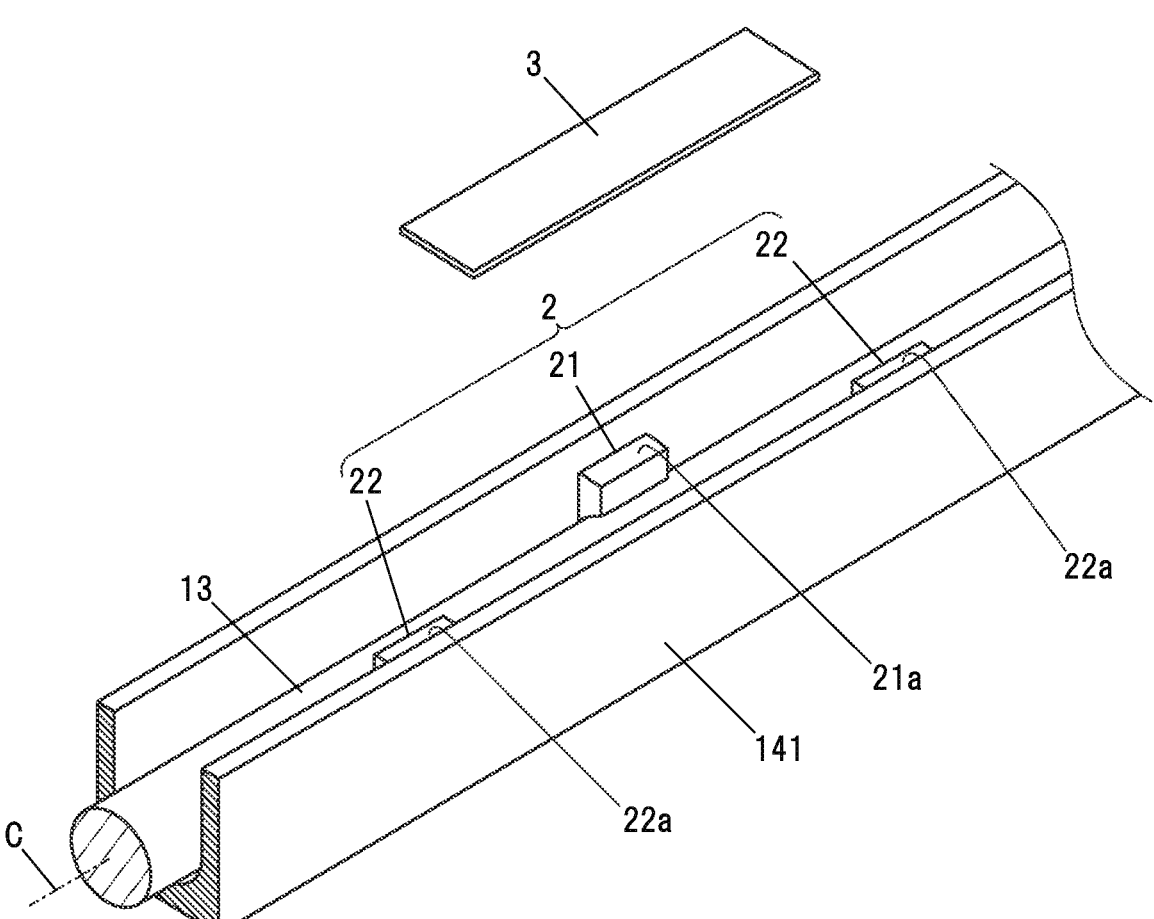
FIG. 3 is a perspective view showing the rack shaft, the housing, the target, and the substrate.

FIG. 2 is a cross-sectional view of the rack shaft 13, the housing 14, the target 2, and the substrate 3 taken along line A-A in FIG. 1. FIG. 3 is a perspective view showing the rack shaft 13, the main body 141 of the housing 14, the target 2, and the substrate 3. In FIG. 3, the center axis C of the rack shaft 13 is indicated by a dash-dot line. The rack shaft 13 moves along the central axis line C by the moving force applied by the electric motor 16. The direction parallel to the center axis C of the rack shaft 13 is hereinafter referred to as the axial direction.

The rack shaft 13 is a rod-shaped body made of steel with a circular cross section. The housing 14 has the main body 141 made of metal and a lid 142 made of resin, and the lid 142 is attached to the main body 141 by, for example, adhesion. The main body 141 has a U-shaped cross-section in which an accommodation space 140 for accommodating the rack shaft 13 is formed, and the accommodation space 140 opens upward in the vertical direction. A diameter D of the rack shaft 13 is, for example, 25 mm.

A gap of 1 mm or more, for example, is formed between an outer peripheral surface 13a of the rack shaft 13 and an inner surface 140a of the accommodation space 140. The lid 142 is formed in a flat plate shape and covers the accommodation space 140 from above in the vertical direction. The main body 141 is a non-magnetic material made of die-cast aluminum alloy, for example. The material of the lid 142 is not necessarily limited to resin, but it is desirable to use a non-magnetic and non-conductive material.

The target 2 consists of one first target portion 21 and two second target portions 22. The first target portion 21 and the second target portions 22 are fixed to the rack shaft 13 so that they protrude from the outer peripheral surface 13a of the rack shaft 13 toward the substrate 3. The two second target portions 22 are spaced apart in the axial direction of the rack shaft 13, and the first target portion 21 is positioned at an intermediate position between the two second target portions 22 in the axial direction. In the present embodiment, the first target portion 21 and the two second target portions 22 are separate bodies, but they may be integrated. In addition, the number of the first target portions 21 may be two or more, and the number of the second target portions 22 may be three or more. In other words, the target 2 should have at least one first target portion 21 and at least two second target portions 22.

The target 2 is made of a material with higher magnetic permeability than that of the rack shaft 13 or a material with higher electrical conductivity than that of the rack shaft 13. When a material with higher magnetic permeability than that of the rack shaft 13 is used as the material of the target 2, it is desirable to use a magnetic material such as ferrite, which has high electrical resistance and is less likely to generate eddy currents. When a material with higher conductivity than that of the rack shaft 13 is used for the target 2, a metal mainly composed of aluminum or copper, for example, may be used as the material.

In the present embodiment, the first target portion 21 and the second target portions 22 protrude from the outer peripheral surface 13a of the rack shaft 13 toward the substrate 3. Therefore, even if a material with equal magnetic permeability to the rack shaft 13 or a material with equal electrical conductivity to the rack shaft 13 is used as the material for the target 2, the same actions and effects described below can be obtained. However, in order to increase the accuracy of position detection, it is desirable to use a high permeability material with a higher magnetic permeability than the material of rack shaft 13 or a high conductivity material with a higher conductivity than the material of rack shaft 13 as the material of the target 2.

The first target portion 21 and the second target portions 22 are fixed to the upper part of the rack shaft 13 by means of fixing such as adhesion or welding, for example. The facing surfaces 21a and 22a of the first and second target portions 21 and 22 facing the substrate 3 are formed in flat shape and disposed in parallel to a front surface 3a of the substrate 3 via an air gap G. The back surface 3b of the substrate 3 is fixed to the lid 142 by an adhesive 7. The shape of the facing surfaces 21a and 22a of the first and second target portions 21 and 22, viewed from the substrate 3 side, is a rectangular shape long in the axial direction.

The width W of the air gap G is, for example, 1 mm. A minimum thickness T of the first and second target portions 21 and 22 in the direction perpendicular to the facing surfaces 21a and 22a is, for example, 5 mm. Furthermore, in the present embodiment, the rack shaft 13 is formed to have a circular cross-section, but the cross-section of the rack shaft 13 is not limited to a circle but may be in a D-shape in which a part is formed in a straight line or in a polygonal shape.

The substrate 3 is a four-layer substrate having a first wiring layer 301, a second wiring layer 302, a third wiring layer 303, and a fourth wiring layer 304. The first wiring layer 301 and the fourth wiring layer 304 are the outer layers of the substrate 3, while the second wiring layer 302 and the third wiring layer 303 are the inner layers of the substrate 3. A plate-shaped base material 30 made of a dielectric material such as FR4 (glass fiber impregnated with epoxy resin and heat-cured) is placed between the first wiring layer 301 and the second wiring layer 302, between the second wiring layer 302 and the third wiring layer 303, and between the third wiring layer 303 and the fourth wiring layer 304. The first wiring layer 301 and the fourth wiring layer 304 are covered with a resist film 300 having electrical insulation properties. A wiring pattern is formed in the first wiring layer 301, the second wiring layer 302, the third wiring layer 303, and the fourth wiring layer 304, and the wiring patterns of these layers are connected by a via 305 at multiple locations on the substrate 3. The substrate 3 has a flat rectangular shape whose longitudinal direction is the axial direction of the rack shaft 13. The shortitudinal direction of the substrate 3 is perpendicular to the axial direction.

Figures 4A, 4B, 4C:
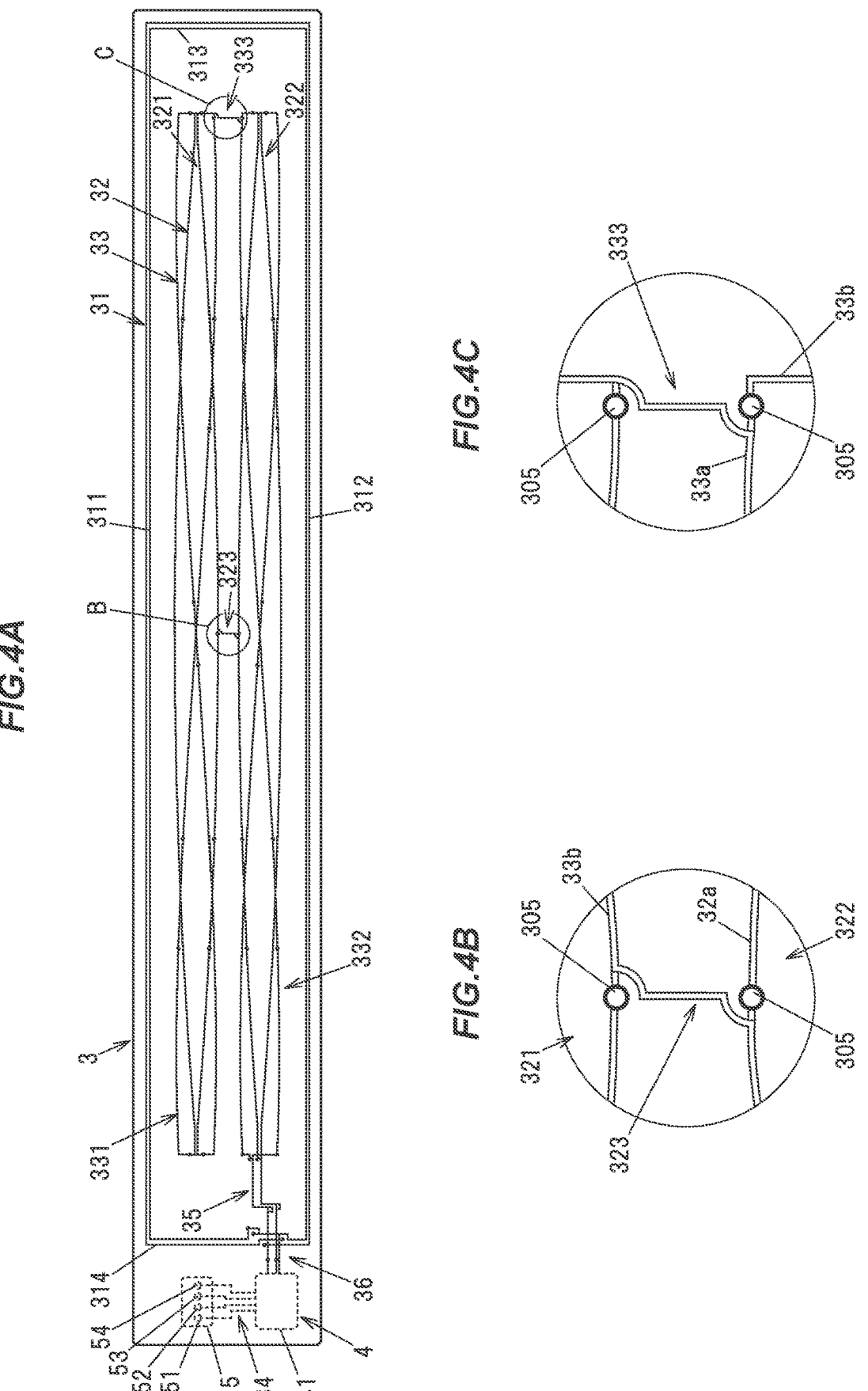
FIG. 4A is an overall view of wiring patterns formed on the first to fourth metal layers of the substrate seen through from the front surface side.
FIG. 4B is an enlarged view of part B in FIG. 4A.
FIG. 4C is an enlarged view of part C in FIG. 4A.
Figure 6A:
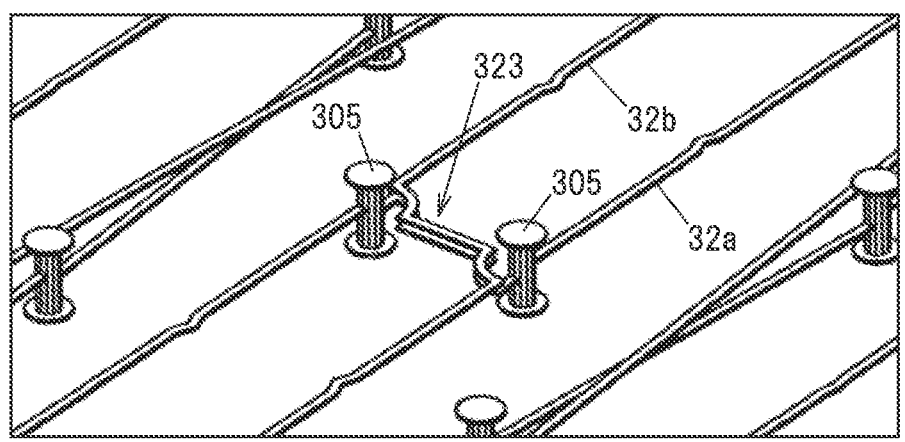
FIG. 6A is a perspective view showing the wiring pattern around part B in FIG. 4A.
Figure 6B:
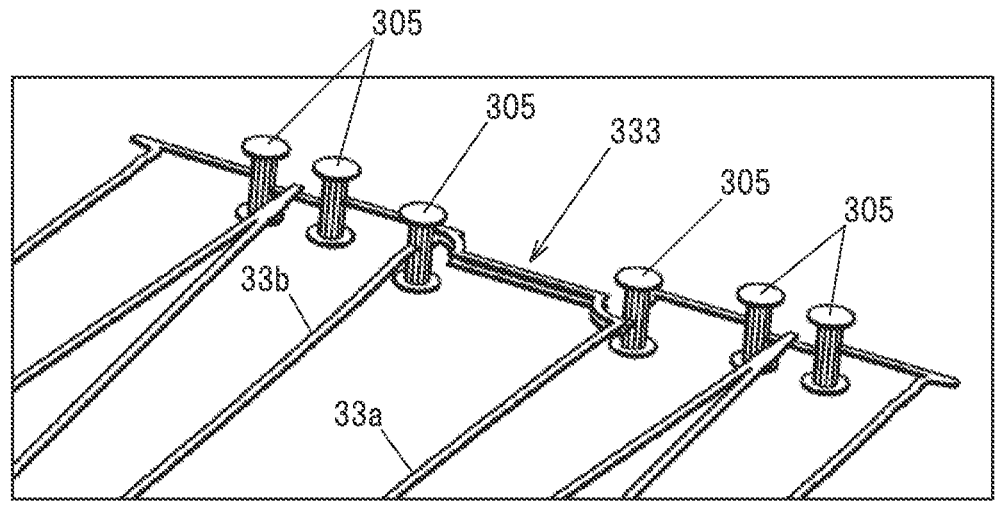
FIG. 6B is a perspective view showing the wiring pattern around part C in FIG. 4A.
Figure 7:
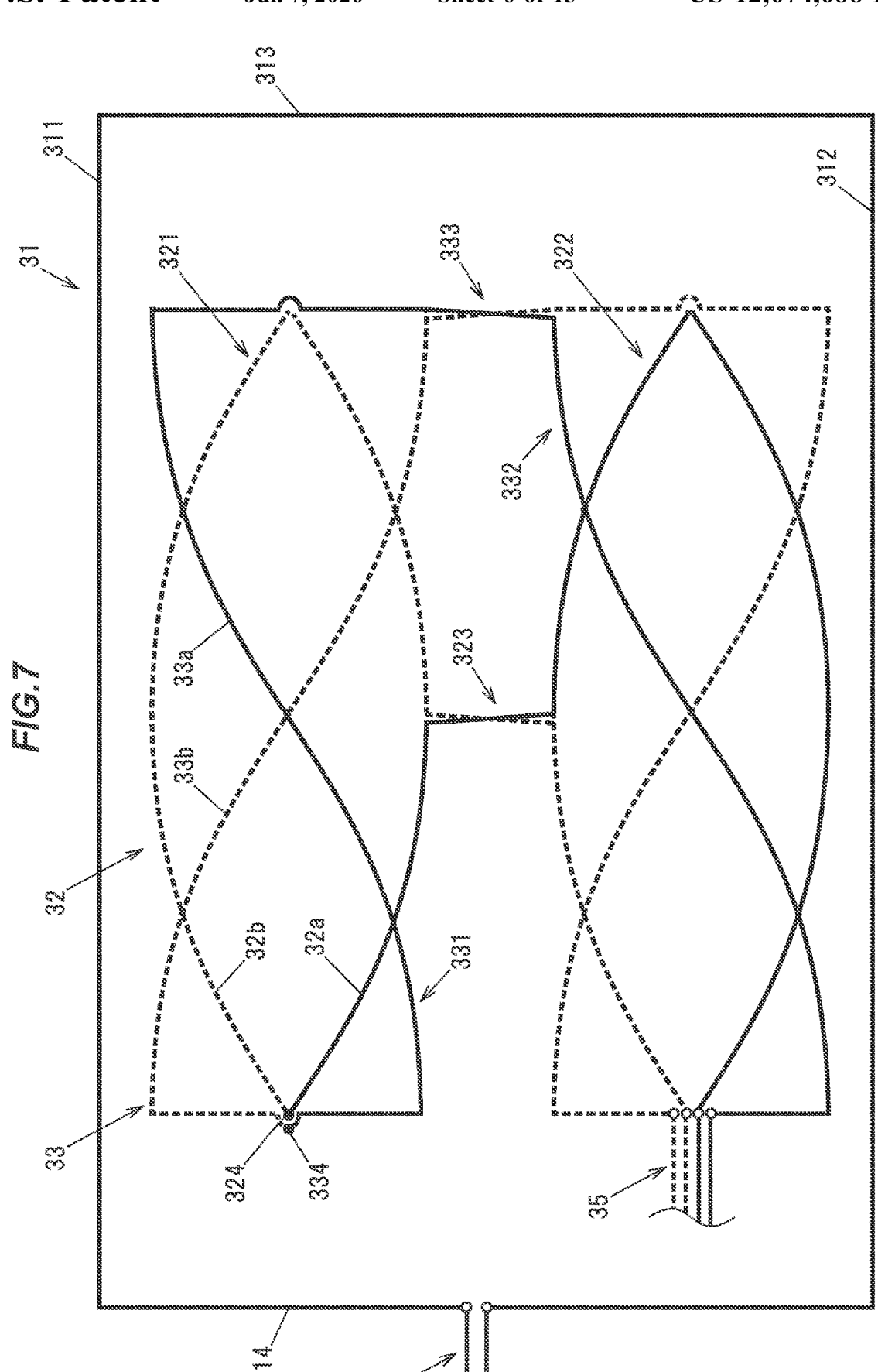
FIG. 7 is a schematic diagram showing the circuit configuration of the substrate.
Figure 8A:
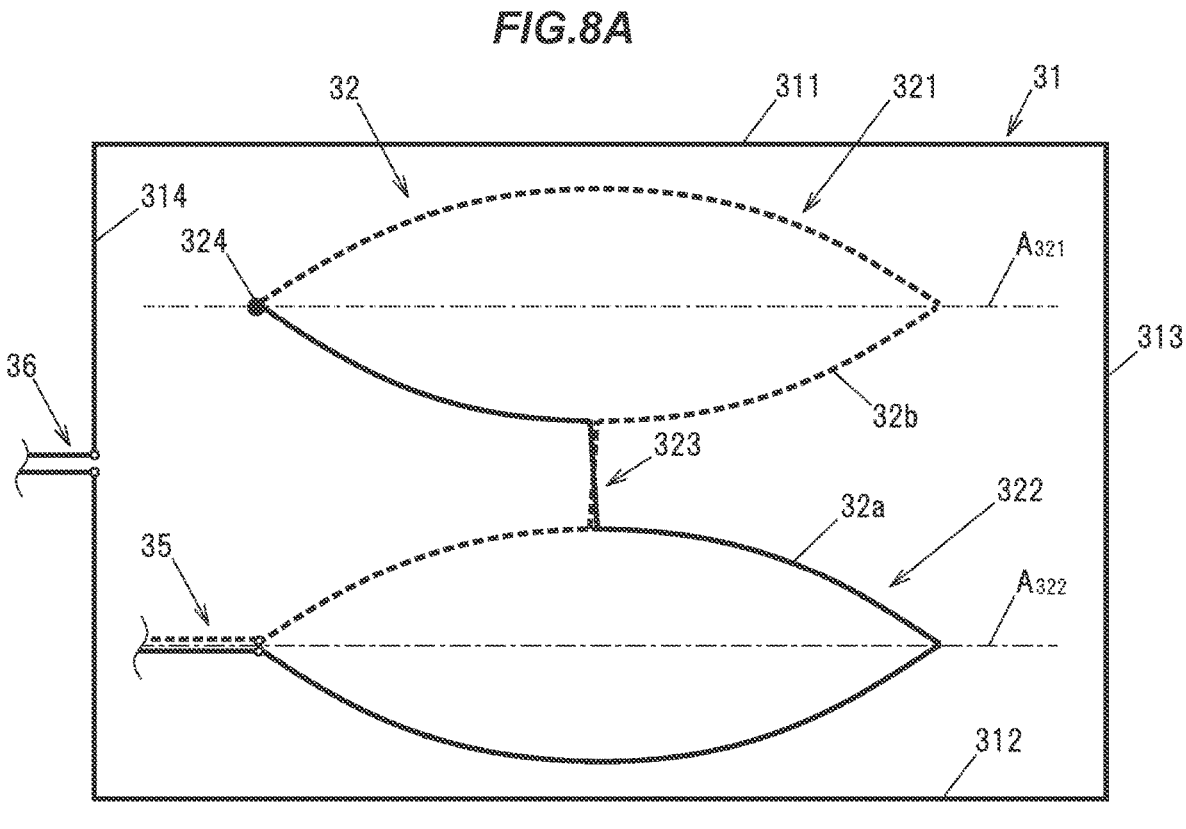
FIG. 8A and FIG. 8B are schematic diagrams showing a part of the circuit configuration of the substrate.
Figure 8B:
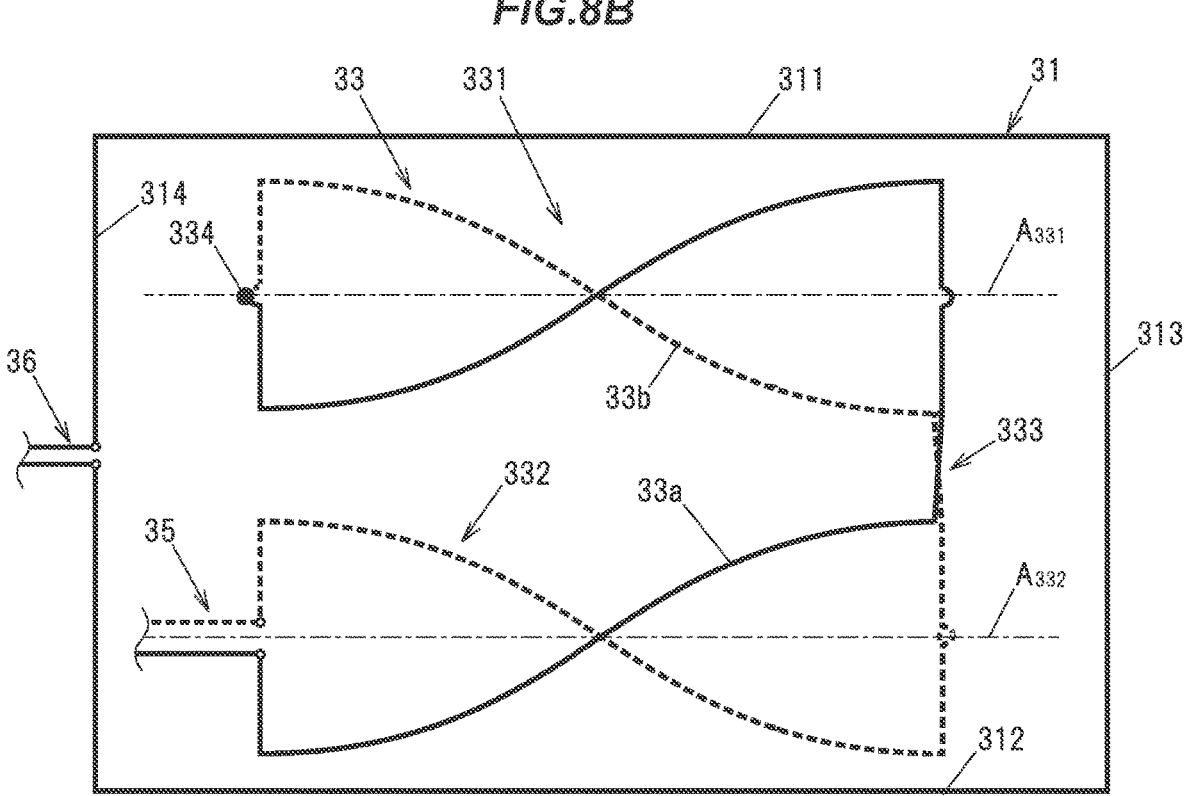

Next, the wiring configuration of the substrate 3 will be described in detail with reference to FIGS. 4A to 8B. FIG. 4A is an overall view of the wiring patterns formed on the first to fourth wiring layers 301 to 304, seeing through the base material 30 from the front surface 3a side. FIG. 4B is an enlarged view of part B in FIG. 4A. FIG. 4C is an enlarged view of part C in FIG. 4A. FIG. 5A is a wiring diagram showing the wiring patterns of the first wiring layer 301 and the second wiring layer 302. FIG. 5B is a wiring diagram showing the wiring patterns of the third wiring layer 303 and the fourth wiring layer 304. FIG. 6A is a perspective view showing the wiring pattern in the vicinity of part B in FIG. 4A. FIG. 6B is a perspective view showing the wiring pattern in the vicinity of part C of FIG. 4A. FIG. 7 is a schematic diagram showing the circuit configuration of the substrate 3. FIGS. 8A and 8B are schematic diagrams schematically showing a part of the circuit configuration of the substrate 3. In FIGS. 4A to 4C, the wiring patterns of the third wiring layer 303 and the fourth wiring layer 304 are shown in light color. The wiring patterns shown in these drawings are merely examples, and various wiring patterns may be used as long as the substrate 3 is formed so as to obtain the effects of the present invention.

On the substrate 3, an excitation coil 31 that generates an alternating magnetic field (AC magnetic field) and two detection coils 32 and 33 in which the magnetic flux of the alternating magnetic field generated by the excitation coil 31 is interlinked, are formed by wiring patterns. The excitation coil 31 is formed on the first wiring layer 301 and the fourth wiring layer 304. The detection coils 32 and 33 are formed on the second wiring layer 302 and the third wiring layer 303 and are stacked in the thickness direction of the substrate 3.

The substrate 3 also includes connector connection lines 34 that connect an IC 41 of the circuit unit 4 and connector pins 51 to 54 of the connector 5, an output voltage transmission line 35 that transmits the output voltage of the detection coils 32 and 33 to the IC 41, and an excitation coil connection line 36 that connects the excitation coil 31 and the IC 41. In FIG. 4A, the IC 41, the connector 5, and the connector connection lines 34 are shown in dashed lines.

The excitation coil 31 has a rectangular shape having a pair of long side portions 311 and 312 extending in the axial direction of the rack shaft 13 and a pair of short side portions 313 and 314 between the pair of long side portions 311 and 312. The detection coils 32 and 33 are formed inside the excitation coil 31. The excitation coil 31 is supplied with an AC voltage from the IC 41 via the excitation coil connection line 36. The excitation coil 31 generates an alternating magnetic field with a frequency corresponding to the frequency of the AC current. The magnetic flux of the alternating magnetic field generated by the excitation coil 31 is interlinked with the detection coils 32 and 33, and an induced voltage corresponding to the frequency of the alternating magnetic field is generated.

The magnetic flux of the alternating magnetic field generated by the excitation coil 31 is also interlinked with the first target portion 21 and the second target portion 22 of the target 2. The magnetic fluxes interlinked with the first and second target portions 21 and 22 affect the intensity distribution of the magnetic flux interlinked with the two detection coils 32 and 33, and the magnitude of the induced voltage generated in the two detection coils 32 and 33 by the alternating magnetic field generated by the excitation coil 31 varies depending on the position of the first target portion 21 and the second target portion 22. The phases of the voltages induced in each of the detection coils 32 and 33 during the movement of the rack shaft 13 from one axial moving end to the other axial moving end are different from each other. In the present embodiment, the phases of the voltages induced in the detection coils 32 and 33 differ by 90°.

Hereafter, of the two detection coils 32 and 33, the detection coil 32 is referred to as the sine wave-shaped detection coil 32 and the detection coil 33 is referred to as the cosine wave-shaped detection coil 33. The output voltages of the sine wave-shaped detection coil 32 and the cosine wave-shaped detection coil 33 are output to the IC 41 by the output voltage transmission line 35.

FIG. 7 schematically shows the shapes of the excitation coil 31, the sine wave-shaped detection coil 32, and the cosine wave-shaped detection coil 33. FIG. 8A shows the shapes of the excitation coil 31 and the sine wave-shaped detection coil 32. FIG. 8B shows the shape of the excitation coil 31 and the cosine wave-shaped detection coil 33. In FIG. 7, FIG. 8A, and FIG. 8B, the width of the substrate 3 in the shortitudinal direction (vertical direction in the drawing) is shown more exaggerated than the length of the substrate 3 in the longitudinal direction (horizontal direction in the drawing).

The sine wave-shaped detection coil 32 has a first portion 321 and a second portion 322 where an induced voltage is generated when the magnetic flux of the alternating magnetic field of the excitation coil 31 is interlinked, and a connection portion 323 connecting the first portion 321 and the second portion 322. The first portion 321 and the second portion 322 extend along the coil longitudinal direction parallel to the axial direction of the rack shaft 13 and are aligned perpendicular to the coil longitudinal direction.

Similarly, the cosine wave-shaped detection coil 33 has a first portion 331 and a second portion 332 where an induced voltage is generated when the magnetic flux of the alternating magnetic field of the excitation coil 31 is interlinked, and a connection portion 333 that connects one end of the first portion 331 in the axial direction with the other end of the second portion 332 in the axial direction. The first portion 331 and the second portion 332 extend along the coil longitudinal direction parallel to the axial direction of the rack shaft 13 and are aligned perpendicular to the coil longitudinal direction.

In the present embodiment, the length in the coil's longitudinal direction of the first portion 321 and the second portion 322 of the sine wave-shaped detection coil 32, and that of the first portions 331 and the second portion 332 of the cosine wave-shaped detection coil 33, are all the same. The first portion 321 of the sine wave-shaped detection coil 32 and the first portion 331 of the cosine wave-shaped detection coil 33, and the second portion 322 of the sine wave-shaped detection coil 32 and the second portion 332 of the cosine wave-shaped detection coil 33 are respectively stacked in the thickness direction of the substrate 3.

In the present embodiment, the entire first portion 321 and the entire second portion 322 of the sine wave-shaped detection coil 32 are aligned in the shortitudinal direction of the substrate 3 perpendicular to the coil longitudinal direction, and the entire first portion 331 and the entire second portion 332 of the cosine wave-shaped detection coil 33 are aligned in the shortitudinal direction of the substrate 3 perpendicular to the coil longitudinal direction.

The sine wave-shaped detection coil 32 is composed of a pair of conductor wires 32a and 32b connected at a turning point 324. In FIG. 7 and FIG. 8A, of the pair of conductor lines 32a and 32b, the conductor wire 32a is shown in a solid line and the conductor wire 32b is shown in a dashed line. The turning point 324 is positioned at the farthest distance from the output voltage transmission line 35 along the pair of conductor wires 32a and 32b.

The cosine wave-shaped detection coil 33 is composed of a pair of conductor wires 33a and 33b connected at a turning point 334. In FIG. 7 and FIG. 8B, of the pair of conductor wires 33a and 33b, the conductor wire 33a is shown in a solid line and the conductor wire 33b is shown in a dashed line. The turning point 334 is positioned at the farthest distance from the output voltage transmission line 35 along the pair of conductor wires 33a and 33b.

Viewed from a direction perpendicular to the coil longitudinal direction, the first portion 321 and the second portion 322 of the sine wave-shaped detection coil 32 is symmetrical across the axis of symmetry A321 and A322 that extend in the axial direction, in combination with a pair of sine wave-shaped conductor wires 32a and 32b. The connection portion 323 connects the first portion 321 and the second portion 322 at the center of the coil longitudinal direction, where the distance between the first portion 321 and the second portion 322 is the shortest. The conductor wires 32a and 32b in the connection portion 323 overlap in the thickness direction of the substrate 3 so that no induced voltage is generated by the alternating magnetic field generated by the excitation coil 31.

Similarly, viewed from a direction perpendicular to the coil's longitudinal direction of the substrate 3, the first portion 331 and the second portion 332 of the cosine wave-shaped detection coil 33 is symmetrical across the axis of symmetry $A_{331}$ and $A_{322}$ that extend in the axial direction, in combination with a pair of cosine wave-shaped conductor wires 33a and 33b. Here, the cosine wave shape is, in other words, a sine wave shape with a phase shift of 90°. The connection portion 333 connects the first portion 331 and the second portion 332 at the end of the coil longitudinal direction, where the distance between the first portion 331 and the second portion 332 is the shortest on the opposite side of the output voltage transmission line 35. The conductor wires 33a and 33b in the connection portion 333 overlap in the thickness direction of the substrate 3 so that no induced voltage is generated by the alternating magnetic field generated by the excitation coil 31.

While the rack shaft 13 moves from one end in the axial direction to the other end in the axial direction, the first target portion 21 faces the first portion 321 of the sine wave-shaped detection coil 32 and the first portion 331 of the cosine wave-shaped detection coil 33, and the second target portions 22 face the second portion 322 of the sine wave-shaped detection coil 32 and the second portion 332 of the cosine wave-shaped detection coil 33. The induced voltages generated in the first portion 321 of the sine wave-shaped detection coil 32 and in the first portion 331 of the cosine wave-shaped detection coil 33 vary with the position of the first target portion 21 relative to the first portions 321 and 331, and the induced voltages generated in the second portion 322 of the sine wave-shaped detection coil 32 and in the second portion 332 of the cosine wave-shaped detection coil 33 vary with the position of the second target portion 22 relative to the second portions 322 and 332.

Figure 9:
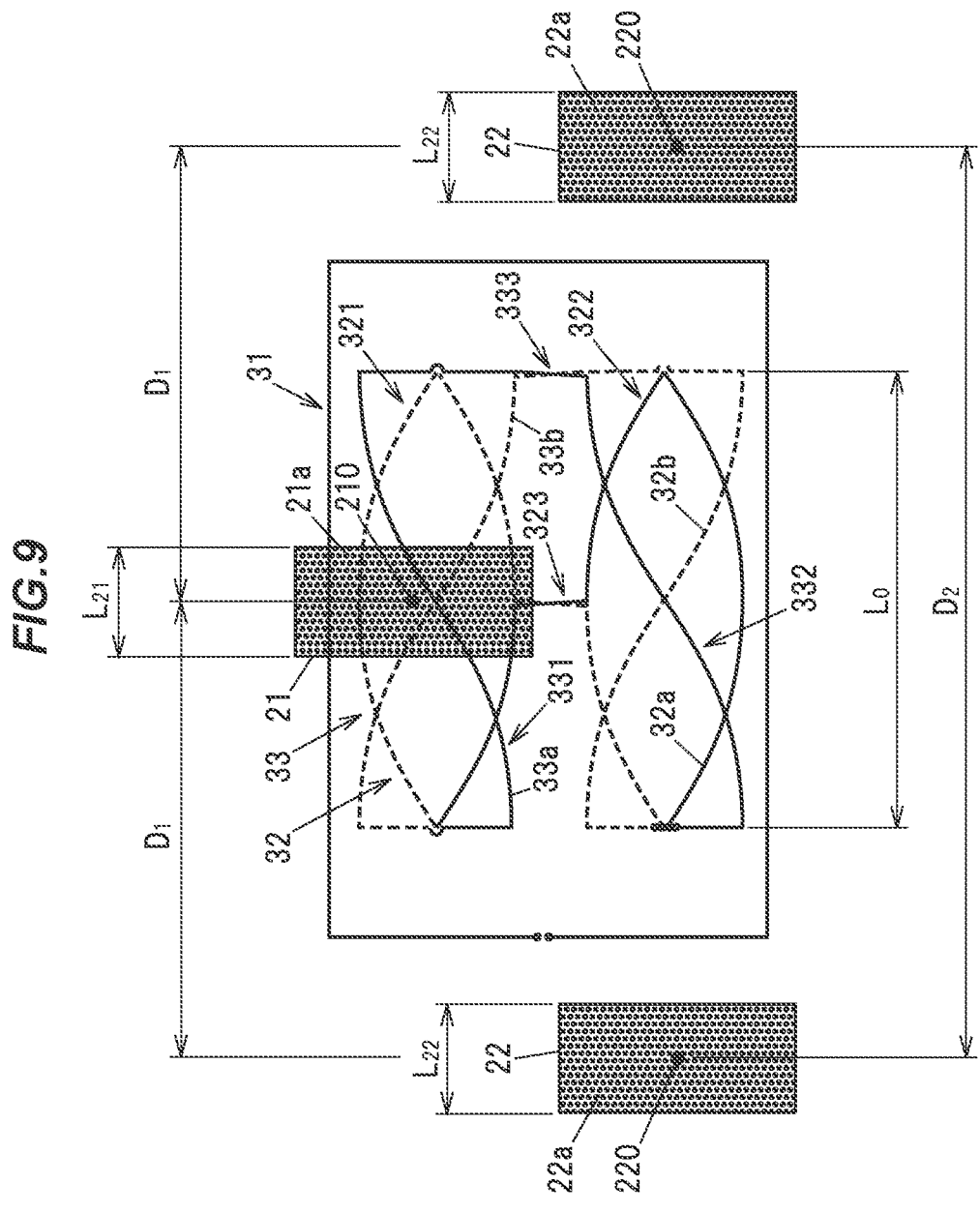
FIG. 9 is an explanatory diagram showing the state when the rack shaft is in the neutral position.
Figures 10A, 10B, 10C, 10D:
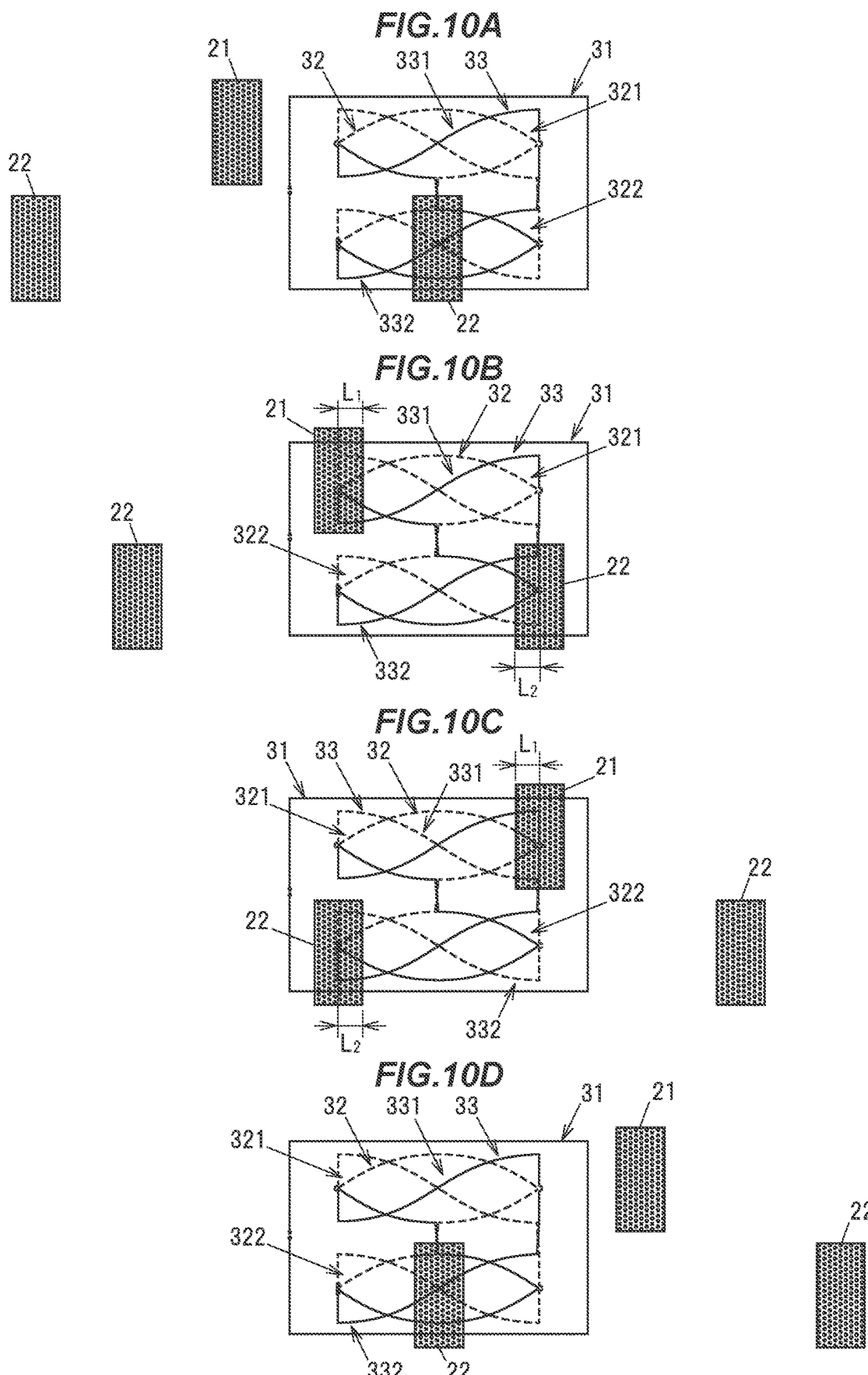
FIG. 10A is an explanatory diagram showing the state when the rack shaft is at one axial moving end.
FIG. 10B is an explanatory diagram showing the state when the rack shaft is at the intermediate position between one axial moving end and the neutral position.
FIG. 10C is an explanatory diagram showing the state when the rack shaft is at the intermediate position between the other axial moving end and the neutral position.
FIG. 10D is an explanatory diagram showing the state when the rack shaft is at the movement end on the other side of the axial direction.

FIG. 9 and FIGS. 10A to 10D illustrate the position of the target 2 relative to the sine wave-shaped detection coil 32 and the cosine wave-shaped detection coil 33. FIG. 9 shows the rack shaft 13 in the neutral position. FIG. 10A shows the state when the rack shaft 13 is at one axial moving end, FIG. 10B shows the state when the rack shaft 13 is at a position halfway between one axial moving end and the neutral position, FIG. 10C shows the state when the rack shaft 13 is at a position halfway between the neutral position and the other axial moving end. FIG. 10D shows the state of the rack shaft 13 when it is at the other end in the axial direction. The neutral position of the rack shaft 13 is the middle position between one axial moving end and the other axial moving end.

In FIG. 9 and FIGS. 10A to 10D, the facing surface $21a$ of the first target portion 21 with the substrate 3 and the facing surfaces $22a$ of the second target portions 22 are shown in light color. In FIG. 9, the center point 210 on the facing surface $21a$ of the first target portion 21 facing the substrate 3, and the center points 220 on the facing surfaces $22a$ of the second target portions 22 are shown as black points, respectively. As shown in FIG. 9, when the rack shaft 13 is in the neutral position, the first target portion 21 faces the center of the first portions 321 and 331 of the sine wave-shaped detection coil 32 and the cosine wave-shaped detection coil 33 in the coil longitudinal direction, and the second target portions 22 do not face the sine wave-shaped detection coil 32 and the cosine wave-shaped detection coil 33.

The distance $D_1$ between the center point 210 of the first target portion 21 and the center points 220 of the two second target portions 22 in the coil longitudinal direction is respectively equal to the coil's longitudinal length $L_0$ of the first portions 321 and 331 and second portions 322 and 332 of the sine wave-shaped detection coil 32 and the cosine wave-shaped detection coil 33. The distance $D_2$ between the center points 220 of the two second target portions 22 in the coil longitudinal direction is twice the coil's longitudinal length $L_0$ of the first portions 321 and 331 and the second portions 322 and 332 of the sine wave-shaped detection coil 32 and the cosine wave-shaped detection coil 33. The length in the axial direction $L_{21}$ of the first target portion 21 and the length in the axial direction $L_{22}$ of the second target portions 22 are the same. The length in the axial direction $L_{21}$ of the first target portion 21 and the length in the axial direction $L_{22}$ of the second target portions 22 are equal to or less than half of the lengths $L_0$ of the sine wave-shaped detection coils 32 and 33, for example.

As shown in FIG. 10A, when the rack shaft 13 is at one side of movement end in the axial direction, the first target portion 21 and one of the second target portions 22 are located off from the sine wave-shaped detection coil 32 and the cosine wave-shaped detection coil 33, and the other second target portion 22 faces the center of the second portions 322 and 332 of the sine wave-shaped detection coil 32 and the cosine wave-shaped detection coil 33 in the coil longitudinal direction.

As shown in FIG. 10B, when the first target portion 21 faces one end of the first portions 321 and 331 of the sine wave-shaped detection coil 32 and the cosine wave-shaped detection coil 33 in the coil longitudinal direction, one of the second target portions 22 is located off from the sine wave-shaped detection coil 32 and the cosine wave-shaped detection coil 33, and the other second target portion 22 faces the other end of the second portions 322 and 332 of the sine wave-shaped detection coil 32 and the cosine wave-shaped detection coil 33 in the coil longitudinal direction.

As shown in FIG. 10C, when the first target portion 21 faces the other end of the first portions 321 and 331 of the sine wave-shaped detection coil 32 and the cosine wave-shaped detection coil 33 in the coil longitudinal direction, one of the second target portions 22 faces one end of the second portions 322 and 332 of the sine wave-shaped detection coil 32 and the cosine wave-shaped detection coil 33 in the coil longitudinal direction, and the other second target portion 22 is located off from the sine wave-shaped detection coil 32 and the cosine wave-shaped detection coil 33.

As shown in FIG. 10D, when the rack shaft 13 is at the other movement end in the axial direction, one of the second target portions 22 faces the center of the second portions 322 and 332 of the sine wave-shaped detection coil 32 and the cosine wave-shaped detection coil 33 in the coil longitudinal direction, and the first target portion 21 and the other second target portion 22 are located off from the sine wave-shaped detection coil 32 and the cosine wave-shaped detection coil 33.

In FIGS. 10B and 10C, the range in the axial direction in which the first portions 321 and 331 of the sine wave-shaped detection coil 32 and the cosine wave-shaped detection coil 33 overlap the first target portion 21 in the direction perpendicular to the substrate 3, is shown as an overlap length $L_1$, while the range in the axial direction in which the second portions 322 and 332 of the sine wave-shaped detection coil 32 and the cosine wave-shaped detection coil 33 and the second target portion 22 overlap in the direction perpendicular to the substrate 3, is shown as an overlap length $L_2$. $L_1$ becomes 0 when the first target portion 21 is displaced in the axial direction from the range in which the sine wave-shaped detection coil 32 and the cosine wave-shaped detection coil 33 are formed, and $L_2$ becomes 0 when the second target portion 22 is displaced in the axial direction from the range in which the sine wave-shaped detection coil 32 and the cosine wave-shaped detection coil 33 are formed. The target 2 has one first target portion 21 and two second target portions 22 offset in the axial direction so that the total length, which is the sum of $L_1$ and $L_2$, is always the same as the axial lengths $L_{21}$ and $L_{22}$ of the first and second target portions 21 and 22, respectively.

When the first target portion 21 and the second target portions 22 are made of a material with higher magnetic permeability than that of the rack shaft 13, the magnetic flux concentrates and flows in the first target portion 21 and the second target portions 22, and the magnetic flux density in a part of the substrate 3 facing the first target portion 21 and the second target portions 22 is higher than that in other parts. Additionally, when the first target portion 21 and the second target portions 22 are made of a material with higher conductivity than that of the rack shaft 13, an eddy current is generated in the first target portion 21 and the second target portions 22 by the alternating magnetic field. This reduces the density of the magnetic flux interlinked with the sine wave-shaped detection coil 32 and the cosine wave-shaped detection coil 33, thus the magnetic flux density in the part of the substrate 3 that faces the first target portion 21 and the second target portions 22 becomes lower than that in other parts. Therefore, the magnitude of the voltage induced in the sine wave-shaped detection coil 32 and the cosine wave-shaped detection coil 33 varies according to the position of the first target portion 21 and the second target portions 22 with respect to the substrate 3.

A voltage with the same period as the period of the AC current supplied to the excitation coil 31 is induced in the sine wave-shaped detection coil 32 and the cosine wave-shaped detection coil 33, and the peak value of the induced voltage varies according to the position of the first target portion 21 and the second target portions 22. The peak value of the voltage here refers to the maximum value of the absolute value of the voltage within a period of one cycle of the alternating current supplied to the excitation coil 31.

The peak values of the voltages induced in the sine wave-shaped detection coil 32 and the cosine wave-shaped detection coil 33 vary within a range of one cycle or less, while the rack shaft 13 moves from one axial moving end to the other axial moving end. This enables the stroke sensor 1 to detect the absolute position of the rack shaft 13 over the entire range $R_1$ in which the rack shaft 13 can move in the axial direction.

Operation of Stroke Sensor 1

Next, the operation of the stroke sensor 1 for detecting the position of the target 2 with respect to the substrate 3 will be explained with reference to FIGS. 11 to 13. In the following description, the position of the target 2 refers to the position of the center point 210 of the first target portion 21 in the axial direction.

Figure 11:
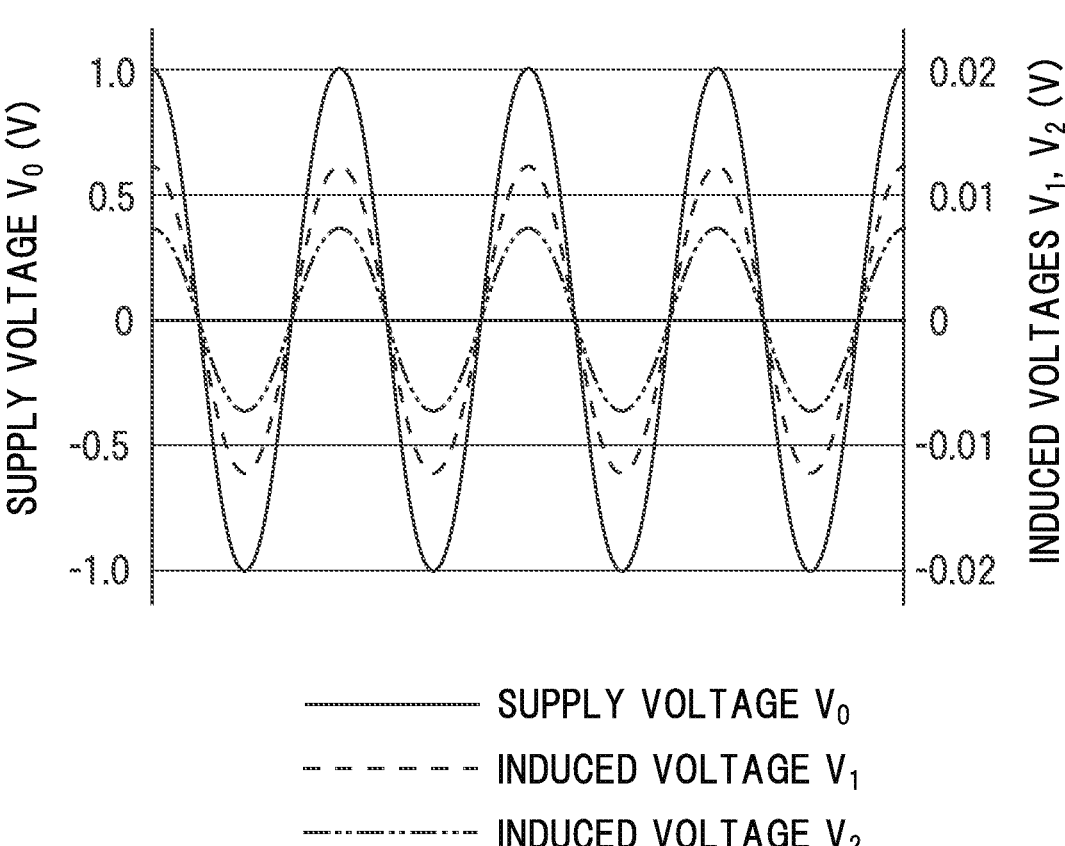
FIG. 11 is a graph showing an example of the relationship between a supply voltage supplied to the excitation coil and the induced voltage induced in a sine wave-shaped detection coil and a cosine wave-shaped detection coil.

FIG. 11 is a graph showing an example of the relationship between the supply voltage $V_0$ supplied to the excitation coil 31, the induced voltage $V_1$ induced in the sine wave-shaped detection coil 32, and the induced voltage $V_2$ induced in the cosine wave-shaped detection coil 33, when the first target portion 21 overlaps the first portions 321 and 331 of the sine wave-shaped detection coil 32 and the cosine wave-shaped detection coil 33. The horizontal axis of the graph in FIG. 11 represents time, and the supply voltage $V_0$ and the induced voltages $V_1$ and $V_2$ are shown in the vertical axes on the left and on the right respectively. In the example shown in FIG. 11, the supply voltage $V_0$ and the induced voltages $V_1$ and $V_2$ are in the same phase, but one or both of the induced voltages $V_1$ and $V_2$ may be in a reverse phase of that of the supply voltage $V_0$ depending on the position of the target 2 with respect to the substrate 3.

Figure 12:
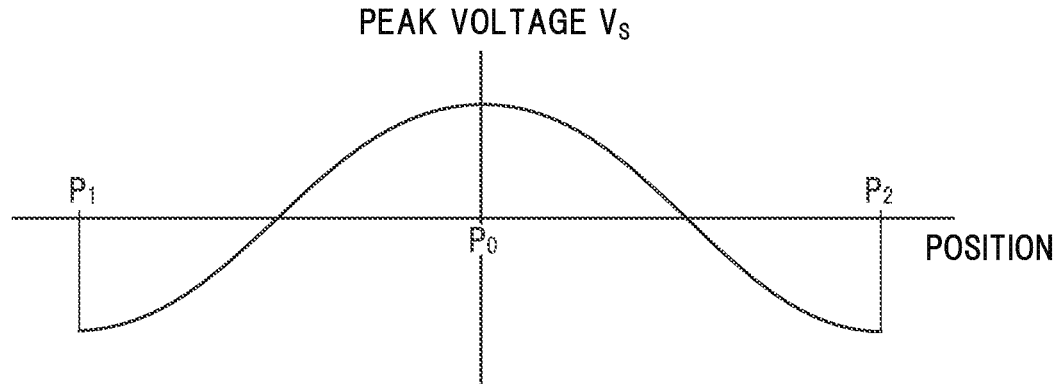
FIG. 12 is a graph showing the relationship between the peak voltage, which is a peak value of the induced voltage induced in the sine wave-shaped detection coil, and the position of the target.

FIG. 12 is a graph showing the relationship between the peak voltage $V_S$ which is the peak value of the induced voltage $V_1$ induced in the sine wave-shaped detection coil 32, and the position of the target 2. FIG. 13 is a graph showing the relationship between the peak voltage $V_C$ which is the peak value of the induced voltage $V_2$ induced in the cosine wave-shaped detection coil 33, and the position of the target 2. The horizontal axis of the graphs shown in FIG. 12 and FIG. 13 indicates the position of the target 2. In the graph shown in FIG. 12, the peak voltage $V_S$ of the sine wave-shaped detection coil 32 is a positive value when the induced voltage $V_1$ induced in the sine wave-shaped detection coil 32 is in the same phase as the voltage $V_0$ supplied to the excitation coil 31, and a negative value when it is in the reverse phase. Also, in the graph shown in FIG. 13, the peak voltage $V_C$ of the cosine wave-shaped detection coil 33 has a positive value when the induced voltage $V_2$ induced in the cosine wave-shaped detection coil 33 is in the same phase as the voltage $V_0$ supplied to the excitation coil 31, and a negative value when it is in the reverse phase.

Figure 13:
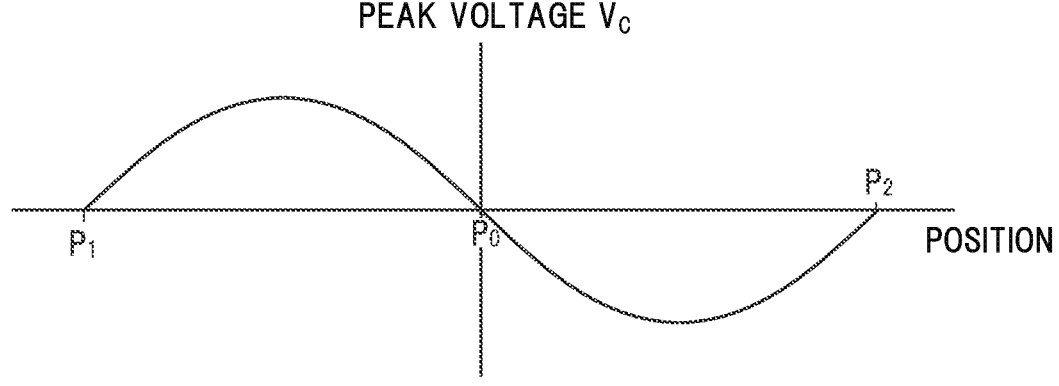
FIG. 13 is a graph showing the relationship between the peak voltage, which is a peak value of the induced voltage induced in the cosine wave-shaped detection coil, and the position of the target.

In the horizontal axis of the graphs in FIG. 12 and FIG. 13, $P_0$ represents the position of the target 2 when the rack shaft 13 is in the neutral position, $P_1$ represents the position of the target 2 in the state shown in FIG. 10A, and $P_2$ represents the position of the target 2 in the state shown in FIG. 10D. The stroke sensor 1 can detect the absolute position of the target 2 in the range of the distance $D_2$ between the center points 220 of the two second target portions 22 in the coil longitudinal direction. In the present embodiment, the length of the range $R_1$ in which the rack shaft 13 can move in the axial direction, and the distance $D_2$ are the same. However, the range $R_1$ may be shorter than the distance $D_2$.

The peak voltages $V_S$ and $V_C$ are obtained by formulas [1] and [2] respectively, with a coordinate value of the abscissa coordinate of the target 2 in the graphs shown in FIG. 12 and FIG. 13 as Xp ($P_1 \leq Xp \leq P_2$). In the formulas [1] and [2], A is a predetermined constant.

[Formula 1]

$$Vs = A\cos\left\{\frac{2\pi}{D_2}(X_P - P_0)\right\} \quad [1]$$

[Formula 2]

$$Vc = A\sin\left\{\frac{2\pi}{D_2}(X_P - P_0)\right\} \quad [2]$$

From formula [2] and formula [3], Xp can be obtained by formula [3]. In other words, the position of the target 2 can be obtained by calculation based on the peak voltages $V_S$ and $V_C$.

[Formula 3]

$$X_p = \frac{D_2}{2\pi}\arctan\left(\frac{Vc}{Vs}\right) + P_0 \quad [3]$$

By the way, if the rack shaft 13 is inclined with respect to the substrate 3 due to vibrations caused by vehicle running and the distance between the substrate 3 and the rack shaft 13 changes, for example, the degree to which the rack shaft 13 affects the intensity distribution of the magnetic flux inside the excitation coil 31 changes depending on the position of the substrate 3 in the longitudinal direction. In the present embodiment, the effect of the inclination of the rack shaft 13 on the detection accuracy of the position of the target 2 is suppressed by the configuration in which the first portions 321 and 331 and the second portions 322 and 332 of the sine wave-shaped detection coil 32 and cosine wave-shaped detection coil 33 are aligned in the shortitudinal direction of the substrate 3. Next, the action and effect of this configuration will be explained by comparing with a comparative example.

Figure 14A:
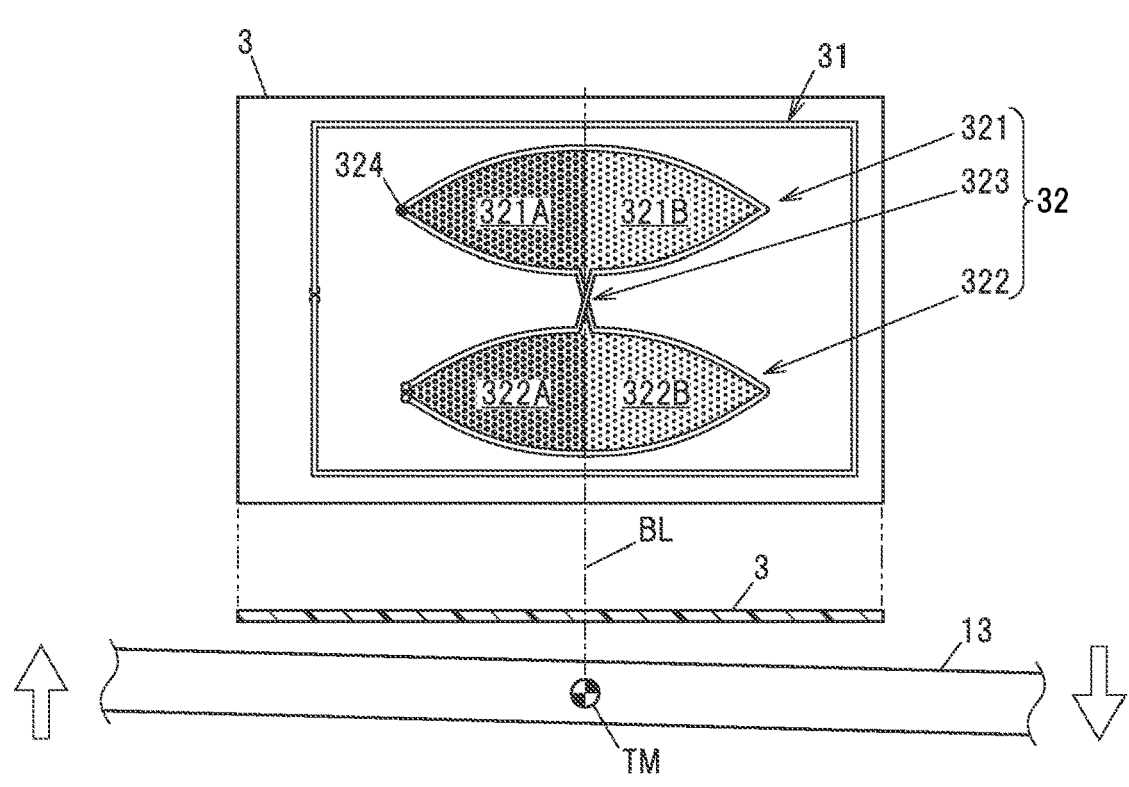
FIG. 14A is an explanatory diagram schematically showing the relationship between the inclination of the rack shaft with respect to the substrate and the effect of the inclination of the rack shaft on the magnetic flux density interlinked with the sine wave-shaped detection coil.
Figure 14B:
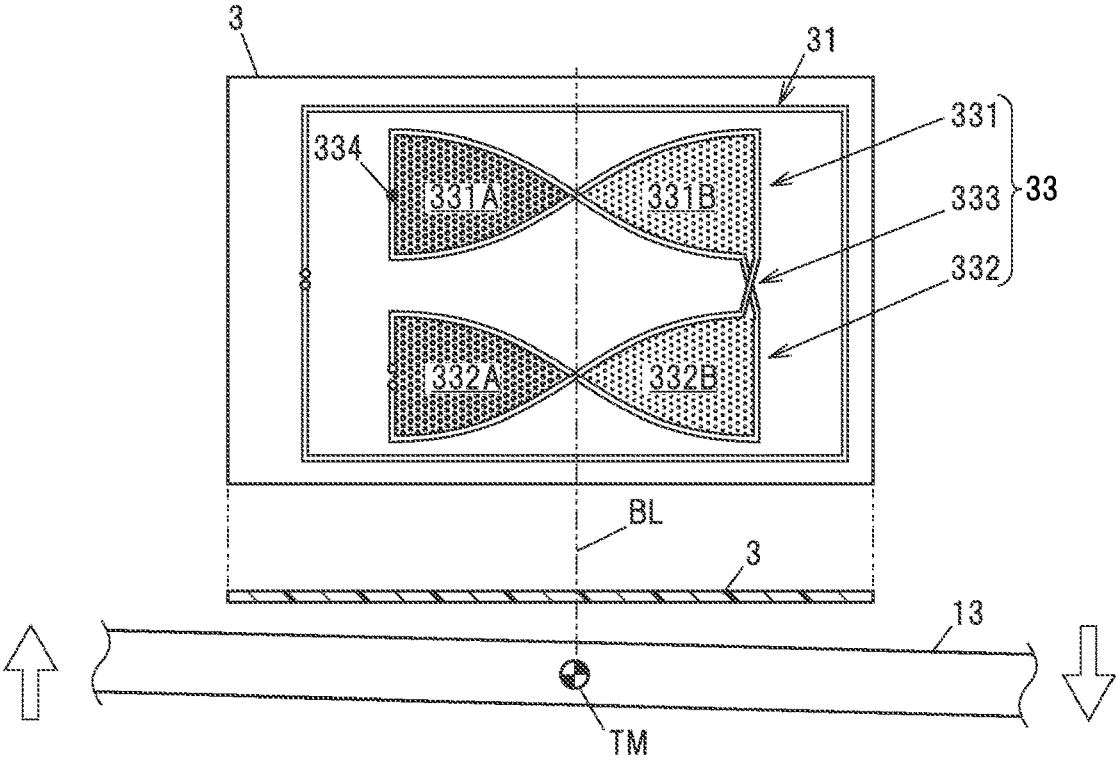
FIG. 14B is an explanatory diagram schematically showing the relationship between the inclination of the rack shaft with respect to the substrate and the effect of the inclination of the rack shaft on the magnetic flux density interlinked with the cosine wave-shaped detection coil.

FIG. 14A is an explanatory diagram schematically showing the relationship between the inclination of the rack shaft 13 with respect to the substrate 3 and the effect of the inclination of the rack shaft 13 on the magnetic flux density interlinked with the sine wave-shaped detection coil 32. FIG. 14B is an explanatory diagram schematically showing the relationship between the inclination of rack shaft 13 with respect to the substrate 3 and the effect of the inclination of rack shaft 13 on the magnetic flux density interlinked with the cosine wave-shaped detection coil 33. In FIGS. 14A and 14B, a bisecting line BL of the first portions 321 and 331 and the second portions 322 and 332 of the sine wave-shaped detection coil 32 and the cosine wave-shaped detection coil 33 is shown in dash double-dot line, and the rack shaft 13 is inclined in the vertical direction in the drawing around the point indicated by a target mark TM on the bisecting line BL. The rack shaft 13 is inclined so that the portion to the left of the target mark TM is closer to the substrate 3 and the portion to the right of the target mark TM is further away from the substrate 3. In FIGS. 14A and 14B, the inclination of rack shaft 13 is shown in an exaggerated manner.

Eddy currents flow in the rack shaft 13 due to interlinking of the magnetic flux of the alternating magnetic field generated by the excitation coil 31. These eddy currents act to weaken the magnetic flux interlinked with the sine wave-shaped detection coil 32 and the cosine wave-shaped detection coil 33. The effect of this action is greater in areas where the distance between the rack shaft 13 and the substrate 3 is closer. In FIGS. 14A and 14B, the areas inside the sine wave-shaped detection coil 32 and the cosine wave-shaped detection coil 33, where this effect is increased by the inclination of the rack shaft 13, are shown in dark gray, and the areas inside the sine wave-shaped detection coil 32 and the cosine wave-shaped detection coil 33, where this effect is reduced by the inclination of the rack shaft 13, are shown in light gray.

As shown in FIG. 14A, in a first left portion 321A and a second left portion 322A that are located to the left of the bisecting line BL in the first portion 321 and the second portion 322 of the sine wave-shaped detection coil 32, when the rack shaft 13 is inclined as in the drawing, the effect of eddy currents generated in the rack shaft 13 increases and the magnetic flux density becomes lower. In a first right portion 321B and a second right portion 322B that are located to the right of the bisecting line BL in the first portion 321 and the second portion 322 of the sine wave-shaped detection coil 32, when the rack shaft 13 is inclined as in the drawing, the effect of eddy currents generated in the rack shaft 13 decreases and the magnetic flux density becomes higher. However, the effect of the decrease in magnetic flux density of the first left portion 321A on the induced voltage $V_1$ and the effect of the increase in magnetic flux density of the first right portion 321B on the induced voltage $V_1$ are offset. Also, the effect of the decrease in the magnetic flux density of the second left portion 322A on the induced voltage $V_1$ and the effect of the increase in the magnetic flux density of the second right portion 322B on the induced voltage $V_1$ are offset. Therefore, when the rack shaft 13 is inclined with respect to the substrate 3, the induced voltage $V_1$ is not varied.

As shown in FIG. 14B, in the first left portion 331A and second left portion 332A that are located to the left of the bisecting line BL in the first portion 331 and the second portion 332 of the cosine wave-shaped detection coil 33, when the rack shaft 13 is inclined as in the drawing, the effect of eddy currents generated in the rack shaft 13 increases and the magnetic flux density becomes lower. In a first right portion 331B and a second right portion 332B that are located to the right of the bisecting line BL in the first portion 331 and the second portion 332 of the cosine wave-shaped detection coil 33, when the rack shaft 13 is inclined as in the drawing, the effect of eddy currents generated in the rack shaft 13 decreases and the magnetic flux density becomes higher. However, the effect of the decrease in magnetic flux density of the first left portion 331A on the induced voltage $V_2$ and the effect of the increase in magnetic flux density of the second right portion 332B on the induced voltage $V_2$ are offset. Also, the effect of the decrease in the magnetic flux density of the second left portion 332A on the induced voltage $V_2$ and the effect of the increase in the magnetic flux density of the first right portion 331B on the induced voltage $V_2$ are offset. This means that when the rack shaft 13 is inclined with respect to the substrate 3, the induced voltage $V_2$ is not varied.

As explained above, in the present embodiment, neither the induced voltage $V_1$ nor the induced voltage $V_2$ is varied when the rack shaft 13 is inclined with respect to the substrate 3. This makes it possible to detect the position of the rack shaft 13 with high accuracy in the present embodiment. Additionally, in the present embodiment, when the rack shaft 13 is in the neutral position, the first target portion 21 faces the center of the first portions 321 and 331 of the sine wave-shaped detection coil 32 and the cosine wave-shaped detection coil 33 in the coil longitudinal direction. Therefore, the position of the target 2 near the neutral position can be detected more accurately, for example, than a case where the first target portion 21 faces the ends of the first portions 321 and 331 of the sine wave-shaped detection coil 32 and the cosine wave-shaped detection coil 33 when the rack shaft 13 is in the neutral position. This is because it is less susceptible to dimensional errors in the axial distance between the first and second target portions 21 and 22 and to the effects of overlapping wiring patterns at the ends of the first portions 321 and 331 of the sine wave-shaped detection coil 32 and the cosine wave-shaped detection coil 33.

Comparative Example

Figure 15A:
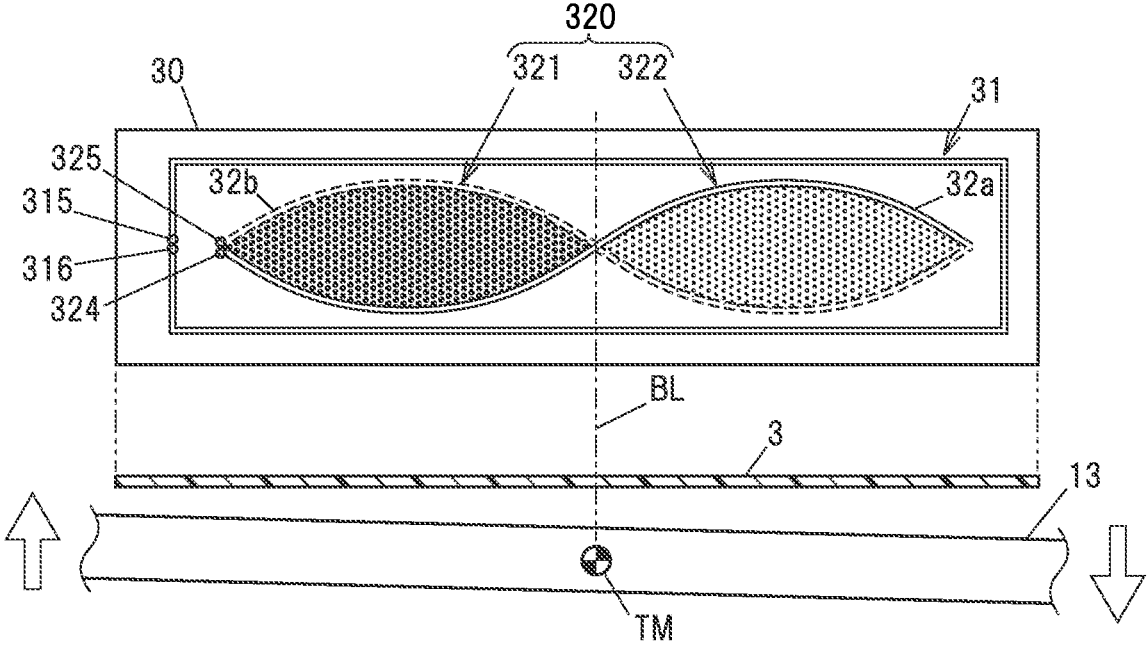
FIG. 15A is an explanatory diagram schematically showing the relationship between the inclination of the rack shaft with respect to the substrate and the effect of the inclination of the rack shaft on the magnetic flux density interlinked with the sine wave-shaped detection coil according to the comparative example.
Figure 15B:
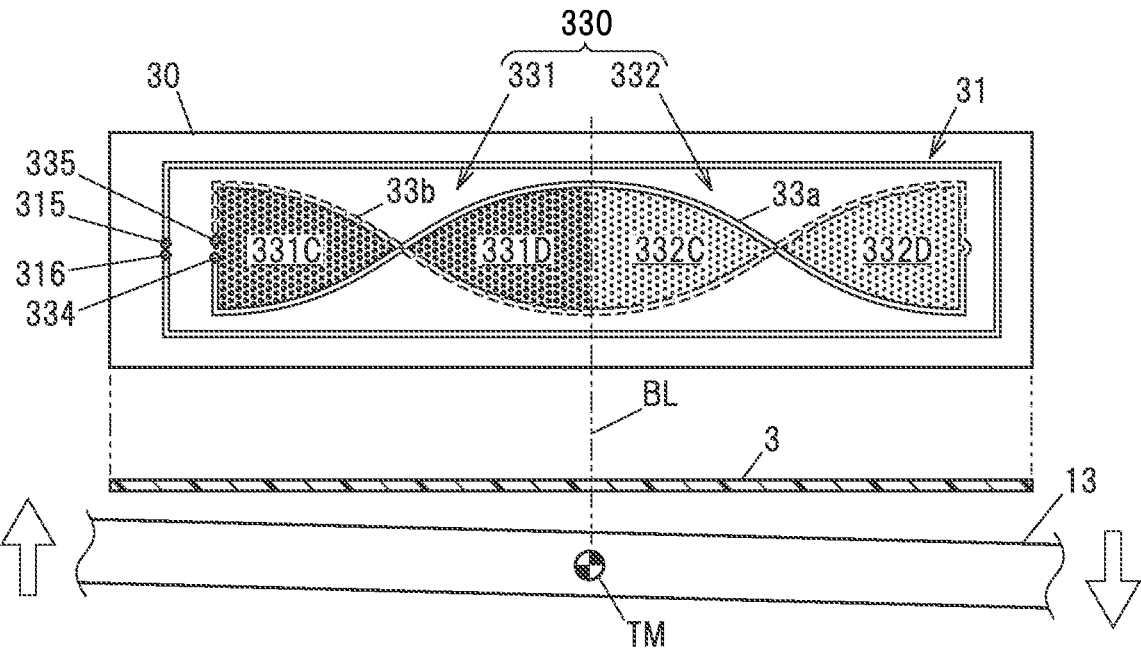
FIG. 15B is an explanatory diagram schematically showing the relationship between the inclination of the rack shaft with respect to the substrate and the effect of the inclination of the rack shaft on the magnetic flux density interlinked with the cosine wave-shaped detection coil according to the comparative example.

FIG. 15A is an explanatory diagram schematically showing the relationship between the inclination of the rack shaft 13 with respect to the substrate 3 and the effect of the inclination of the rack shaft 13 on the magnetic flux density interlinked with a sine wave-shaped detection coil 320 according to a comparative example. FIG. 15B is an explanatory diagram schematically showing the relationship between the inclination of rack shaft 13 with respect to the substrate 3 and the effect of the inclination of the rack shaft 13 on the magnetic flux density interlinked with a cosine wave-shaped detection coil 330 according to the comparative example.

The sine wave-shaped detection coil 320 according to the comparative example has the first portion 321 and the second portion 322 formed by a pair of conductor wires 32a and 32b as the sine wave-shaped detection coil 32 according to the embodiment described above. However, it does not have the connection portion 323, and the first portion 321 and the second portion 322 are aligned along the axial direction of the rack shaft 13 with the bisecting line BL between them. Also, the cosine wave-shaped detection coil 330 according to the comparative example has, the first portion 331 and the second portion 332 formed by a pair of conductor wires 33a and 33b as the cosine wave-shaped detection coil 33 according to the embodiment described above. However, it does not have the connection portion 333, and the first portion 331 and the second portion 332 are aligned along the axial direction of the rack shaft 13 with the bisecting line BL between them.

In the sine wave-shaped detection coil 320 according to the comparative example, when the rack shaft 13 is inclined as shown in the drawing., the effect of eddy currents generated in the rack shaft 13 increases and the magnetic flux density becomes low in the first portion 321, while the effect of eddy currents generated in the rack shaft 13 decreases and the magnetic flux density becomes higher in the second portion 322. However, since the alignment of the pair of conductor wires 32a and 32b in the shortitudinal direction of the substrate 3 is opposite in the first and second portions 321 and 322, the effect of the lower magnetic flux density in the first portion 321 and the effect of the higher magnetic flux density in the second portion 322 are not offset, and thus the inclination of the rack shaft 13 fluctuates the peak value of the induced voltage $V_1$. For this reason, when the sine wave-shaped detection coil 320 according to the comparative example is used, an error may occur in the detection position of the rack shaft 13.

In the cosine wave-shaped detection coil 330 according to the comparative example, when each of the areas inside the cosine wave-shaped detection coil 330 is designated as the first left portion 331C, the first right portion 331D, the second left portion 332C, and the second right portion 332D as shown in FIG. 15B, the effect of the inclination of the rack shaft 13 on the magnetic flux of the first left portion 331C and the effect of the inclination of the rack shaft 13 on the magnetic flux of the second right portion 332D are offset, and the effect of the inclination of the rack shaft 13 on the magnetic flux of the first right portion 331D and the effect of the inclination of the rack shaft 13 on the magnetic flux of the second left portion 332C are offset, and thus, when the rack shaft 13 is inclined with respect to the substrate 3, the induced voltage $V_2$ is not varied.

Summary of Embodiment

Next, technical ideas understood from the above embodiment, are described with reference to the reference numerals and the like used in the embodiment. However, each reference numeral in the following description does not limit the constituent elements in the scope of claims to the members and the like specifically shown in the embodiment.

According to the first feature, a position detection device 1 (stroke sensor 1) for detecting the position of a shaft (rack shaft 13) that moves forward and backward in the axial direction includes an excitation coil 31 that generates an alternating magnetic field; a target which is fixed to the shaft and in which the magnetic flux of the alternating magnetic field is interlinked; and detection coils 32, 33 in which the magnetic flux of the alternating magnetic field is interlinked, wherein each of the detection coils 32, 33 has a first portion 321, 331 and a second portion 322, 332 where an induced voltage is generated by the magnetic flux of the alternating magnetic field being interlinked, and a connection portion 323, 333 connecting the first portion 321, 331 and the second portion 322, 332, wherein the first portions 321, 331 and the second portions 322, 332 extend along the coil longitudinal direction parallel to the axial direction and at least a portion of each is aligned perpendicular to the coil longitudinal direction, wherein the target 2 has at least one first target portion facing the first portion 321, 331 and at least two second target portions facing the second portion 322, 332, with the at least two second target portions being apart in the axial direction, wherein the induced voltage generated in the first portion 321, 331 changes according to the position of the first target portion relative to the first portion 321, 331, wherein the induced voltage generated in the second portion 322, 332 changes according to the position of the second target portion relative to the second portion 322, 332, wherein the first target portion is positioned between the at least two second target portions in the axial direction, and wherein the first target portion faces the central part in the longitudinal direction of the first portion 321, 331 of the coil when the shaft is in the central position between the movement end on one side of the axial direction and the movement end on the other side of the axial direction.

According to the second feature, in the position detection device 1 as described by the first feature, the distance $D_2$ between the center points 220 of at least two second target portions is twice the length of the second portion 322, 332 in the coil longitudinal direction.

According to the third feature, in the position detection device 1 as described by the second feature, at least one second target portion of the two second target portions faces the end of the second portion 322, 332 in the coil longitudinal direction when the first target portion faces one end of the first portion 321, 331 in the coil longitudinal direction, and wherein at least the other second target portion of the two second target portions faces the end of the second portion 322, 332 in the coil longitudinal direction when the first target portion faces the other end of the first portion 321, 331 in the coil longitudinal direction.

According to the fourth feature, in the position detection device 1 as described by the third feature, the detection coil 32, 33 includes the first portion 321, 331 and the second portion 322, 332 that respectively form a combined shape with a pair of sine wave-shaped conductor wires 32a, 32b, 33a, 33b that are symmetrical across a symmetry axis line $A_{321}, A_{322}, A_{331}, A_{332}$ extending in the coil longitudinal direction, when viewed from a direction perpendicular to the coil longitudinal direction.

According to the fifth feature, in the position detection device 1 as described by the fourth feature, wherein the length $L_0$ of the first portion 321, 331 and the length $L_0$ of the second portion 322, 332 in the coil longitudinal direction are the same, and wherein the whole of the first portion 321, 331 and the whole of the second portion 322, 332 are aligned in an alignment direction perpendicular to the coil longitudinal direction.

According to the sixth feature, in the position detection device 1 as described by any one of the first to fifth features, the excitation coil 31 and the detection coils 32, 33 are formed on a single substrate 3.

According to the seventh feature, the position detection device 1 as described by any one of the first to fifth features includes the two detection coils 32, 33, wherein the phases of the voltage induced in the two detection coils 32, 33 during the movement of the shaft from one axial moving end to the other axial moving end are different from each other.

According to the eighth feature, in the position detection device 1 as described by the seventh feature, the excitation coil 31 and two the detection coils 32, 33 are formed on the single substrate 3 and the two detection coils 32, 33 are stacked in the thickness direction of the substrate 3.

According to the ninth feature, in the position detection device 1 as described by the eighth feature, the two detection coils 32, 33 are formed inside the excitation coil 31.

According to the tenth feature, in the position detection device 1 as described by the first feature, the shaft is a rack shaft of a steering device of a vehicle.

That is all for the description of the embodiment of the present invention, but the above embodiment does not limit the invention according to the scope of claims. It should be noted that not all combinations of features are essential to the means for solving problems of the invention. Additionally, the present invention may be implemented by modifying it, as appropriate, without departing from the scope and spirit of the invention. For example, the following modifications can be made.

The above embodiment describes a case in which the first target portion 21 and the second target portions 22 are installed protruding from the rack shaft 13 toward the substrate 3, but it is not limited to this case. For example, the target 2 may be a flat plate long in the axial direction of the rack shaft 13, and the first target portion 21 and the second target portions 22 may be formed as recesses or notches. Even in this case, the position of the rack shaft 13 can be detected in the same way as in the above embodiment, because the magnetic flux density changes between the portion facing the first target portion 21 and the second target portions 22 and the portion not facing them.

Also, the above embodiment describes a case in which the detection coils 32 and 33 are sine wave-shaped, but it is not limited to this case, for example, they may be triangular wave-shaped. Furthermore, the excitation coil 31 and detection coils 32 and 33 do not necessarily have to be formed on a substrate.

The invention claimed is:

1. A position detection device, configured to detect a position of a shaft that moves forward and backward in an axial direction, comprising:

an excitation coil that generates an alternating magnetic field;

a target fixed to the shaft and interlinked with a magnetic flux of the alternating magnetic field; and a detection coil in which the magnetic flux of the alternating magnetic field is interlinked, wherein the detection coil has a first portion and a second portion in which an induced voltage is generated when the magnetic flux of the alternating magnetic field is interlinked, and a connection portion connecting the first portion and the second portion, wherein the first portion and the second portion respectively extend along a coil longitudinal direction parallel to the axial direction, and at least a portion of each is aligned perpendicular to the coil longitudinal direction, wherein the target has at least one first target portion facing the first portion and at least two second target portions facing the second portion, with the at least two second target portions being spaced apart in the axial direction, wherein an induced voltage generated in the first portion varies with a position of the first target portion with respect to the first portion, and an induced voltage generated in the second portion varies with a position of the second target portion with respect to the second portion, and wherein the first target portion is located between the at least two second target portions in the axial direction, and when the shaft is in a central position between one axial moving end and an other axial moving end, the first target portion faces a central part in the coil longitudinal direction of the first portion.

2. The position detection device according to claim 1, wherein a distance between respective center points of the at least two second target portions is twice a length of the second portion in the coil longitudinal direction.

3. The position detection device according to claim 2, wherein one of the at least two second target portions faces an end of the second portion in the coil longitudinal direction when the first target portion faces one end of the first portion in the coil longitudinal direction, and wherein an other of the at least two second target portions faces an end of the second portion in the coil longitudinal direction when the first target portion faces an other end of the first portion in the coil longitudinal direction.

4. The position detection device according to claim 3, wherein the detection coil has a shape consisted of a combination of a pair of sine wave-shaped conductor wires whose respective shapes of the first and second portions, viewed from a direction perpendicular to the coil longitudinal direction, are symmetrical across a symmetry axis line extending in the coil longitudinal direction.

5. The position detection device according to claim 4, wherein a length of the first portion in the coil longitudinal direction and the length of the second portion in the coil longitudinal direction are same, and wherein an entire part of the first portion and an entire part of the second portion are aligned perpendicular to the coil longitudinal direction.

6. The position detection device according to claim 1, wherein the excitation coil and the detection coil are formed on a single substrate.

7. The position detection device according to claim 1, wherein the detection coil comprises two detection coils, wherein phases of voltages induced in the two detection coils while the shaft moves from the one axial moving end to the other axial moving end, are different from each other.

8. The position detection device according to claim 7, wherein the excitation coil and the two detection coils are formed on a single substrate, and the two detection coils are stacked in a thickness direction of the substrate.

9. The position detection device according to claim 8, wherein the two detection coils are formed inside the excitation coil.

10. The position detection device according to claim 1, wherein the shaft is a rack shaft of a vehicle steering device.

* * * * *